US011785544B2

(12) United States Patent
Huang et al.

(10) Patent No.: US 11,785,544 B2
(45) Date of Patent: *Oct. 10, 2023

(54) LOW-POWER WAKE-UP RADIO DISCOVERY PROCEDURE AND FRAME FORMAT

(71) Applicant: Intel Corporation, Santa Clara, CA (US)

(72) Inventors: Po-Kai Huang, San Jose, CA (US); Daniel F. Bravo, Portland, OR (US); Noam Ginsburg, Portland, OR (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/576,167

(22) Filed: Jan. 14, 2022

(65) Prior Publication Data

US 2022/0248328 A1 Aug. 4, 2022

Related U.S. Application Data

(63) Continuation of application No. 16/646,110, filed as application No. PCT/US2018/039996 on Jun. 28, 2018, now Pat. No. 11,228,978.

(Continued)

(51) Int. Cl.
*H04W 52/02* (2009.01)
*H04W 76/11* (2018.01)
(Continued)

(52) U.S. Cl.
CPC ....... *H04W 52/0229* (2013.01); *H04W 48/16* (2013.01); *H04W 52/0235* (2013.01); *H04W 76/11* (2018.02); *H04W 80/02* (2013.01)

(58) Field of Classification Search
CPC ............. H04W 52/0229; H04W 48/16; H04W 52/0235; H04W 76/11; H04W 80/02
See application file for complete search history.

(56) References Cited

U.S. PATENT DOCUMENTS 10,660,038 B2 * 5/2020 Asterjadhi ........ H04W 52/0216
11,228,978 B2 * 1/2022 Huang .............. H04W 52/0229
(Continued)

OTHER PUBLICATIONS 802.11 Working Group of the LAN/MAN Standards Committee of the IEEE Computer Society, "IEEE Standard for Information technology—Telecommunications and information exchange between systems Local and metropolitan area networks—Specific requirements Part 11: Wireless LAN Medium Access Control (MAC) and Physical Layer (PHY) Specifications", IEEE Standards Association, Dec. 7, 2016, 3534 pages.

(Continued)

*Primary Examiner* — Diane D Mizrahi
(74) *Attorney, Agent, or Firm* — Alliance IP, LLC

(57) ABSTRACT

A wireless communication device includes a memory, and a processing circuitry coupled to the memory. The processing circuitry is to process a wake-up radio (WUR) frame transmitted by an Access Point (AP), the WUR frame comprising a medium access control (MAC) header and a frame body, the MAC header comprising a Frame Control field, an Address field, and a Type Dependent (TD) Control field, wherein the Frame Control field comprises a Type field; determine, based on a value of the Type field, that the WUR frame is a WUR Discovery frame; determine an identifier (ID) of the AP front the WUR Discovery frame; and in response to a determination that the WUR frame is a WUR Discovery frame, cause a Primary Connectivity Radio (PCR) corresponding to the wireless communication device to communicate with the AP based on the WUR Discovery frame.

29 Claims, 13 Drawing Sheets

Related U.S. Application Data

(60) Provisional application No. 62/570,351, filed on Oct. 10, 2017.

(51) Int. Cl.
*H04W 48/16* (2009.01)
*H04W 80/02* (2009.01)

(56) References Cited

U.S. PATENT DOCUMENTS

| | | |
|---|---|---|
| 2016/0337973 A1 | 11/2016 | Park et al. |
| 2018/0184378 A1 | 6/2018 | Fang et al. |
| 2018/0184435 A1 | 6/2018 | Cariou et al. |
| 2020/0029276 A1 | 1/2020 | Kim et al. |
| 2020/0245137 A1 | 7/2020 | Chitrakar et al. |
| 2020/0245238 A1 | 7/2020 | Kim et al. |

OTHER PUBLICATIONS

Chu, Liwen, "WUR MAC and Wakeup Frame", doc.: IEEE 802.11-17/0124r4, Jan. 2017, 14 pages.
International Search Report for PCT/US2018/039996 dated Oct. 4, 2018, 3 pages.
Lim, Dongguk, et al., "WUR Frame Structure follow-up", doc.: IEEE 802.11-17/352r1, Mar. 12, 2017, 15 pages.
Wang, Xiaofei, et al., "Purpose Indication of WUR Packets", doc.: IEEE 802.11-17/0387r5, Mar. 2017, 11 pages.
Written Opinion of the International Searching Authority for PCT/US2018/039996 dated Oct. 4, 2018, 8 pages.
Wu, Tianyu, et al., "Wake up packet contents", doc.: IEEE 802.11-17/0680r1, May 9, 2017, 14 pages.

\* cited by examiner

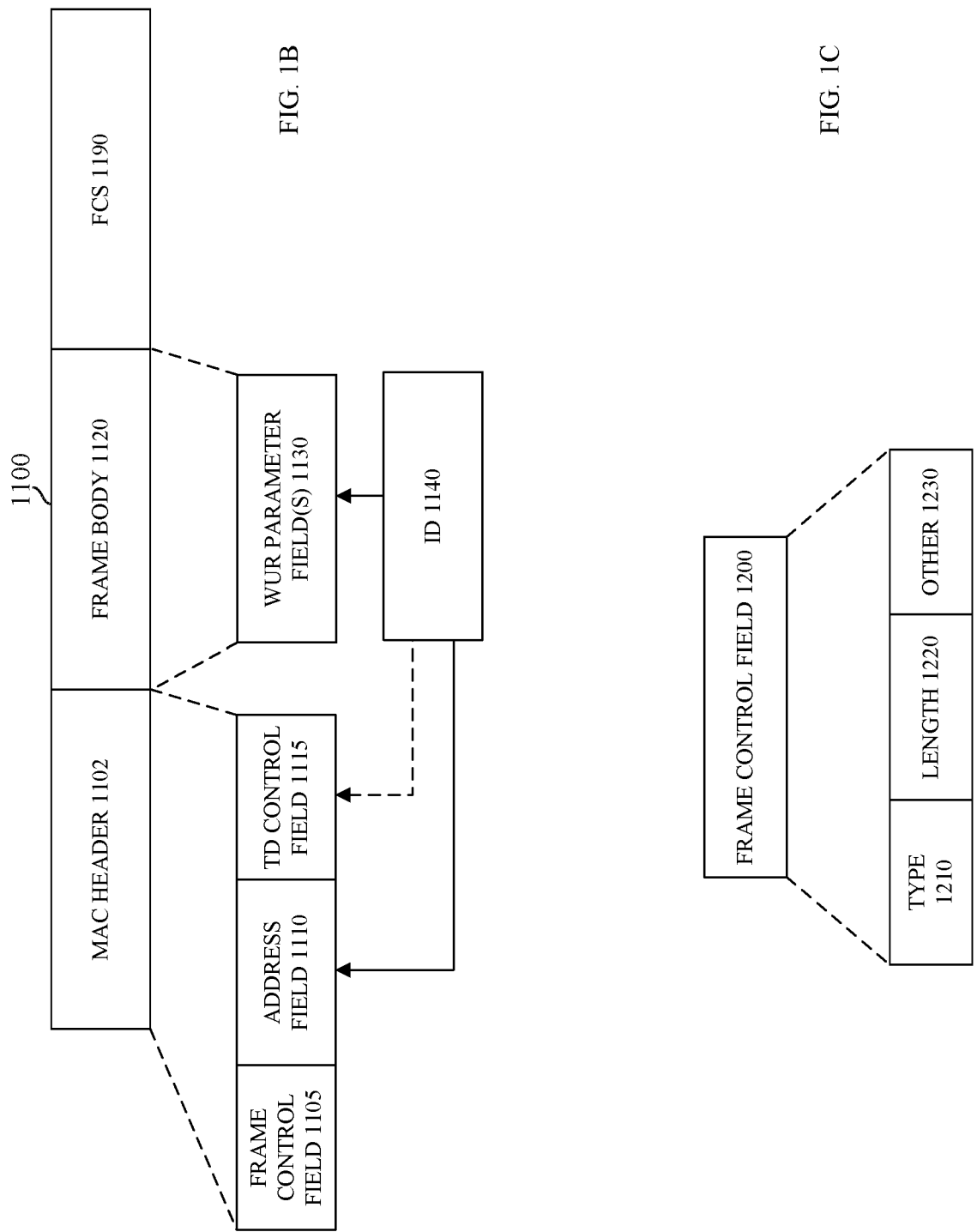

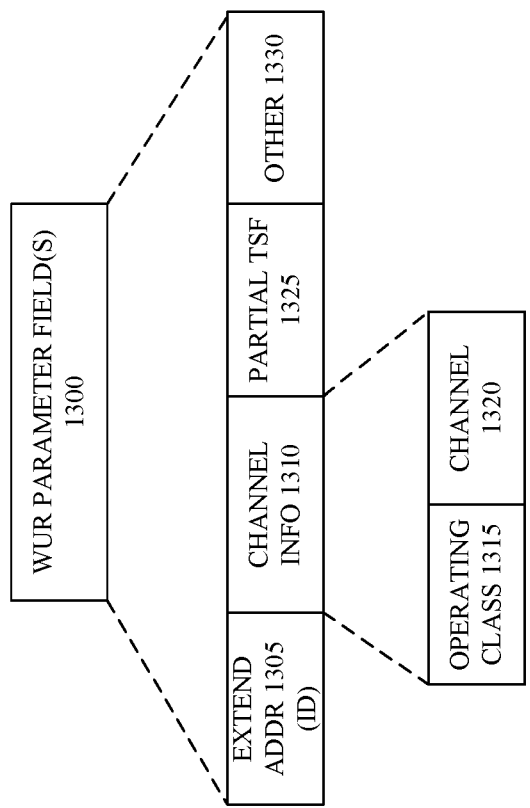

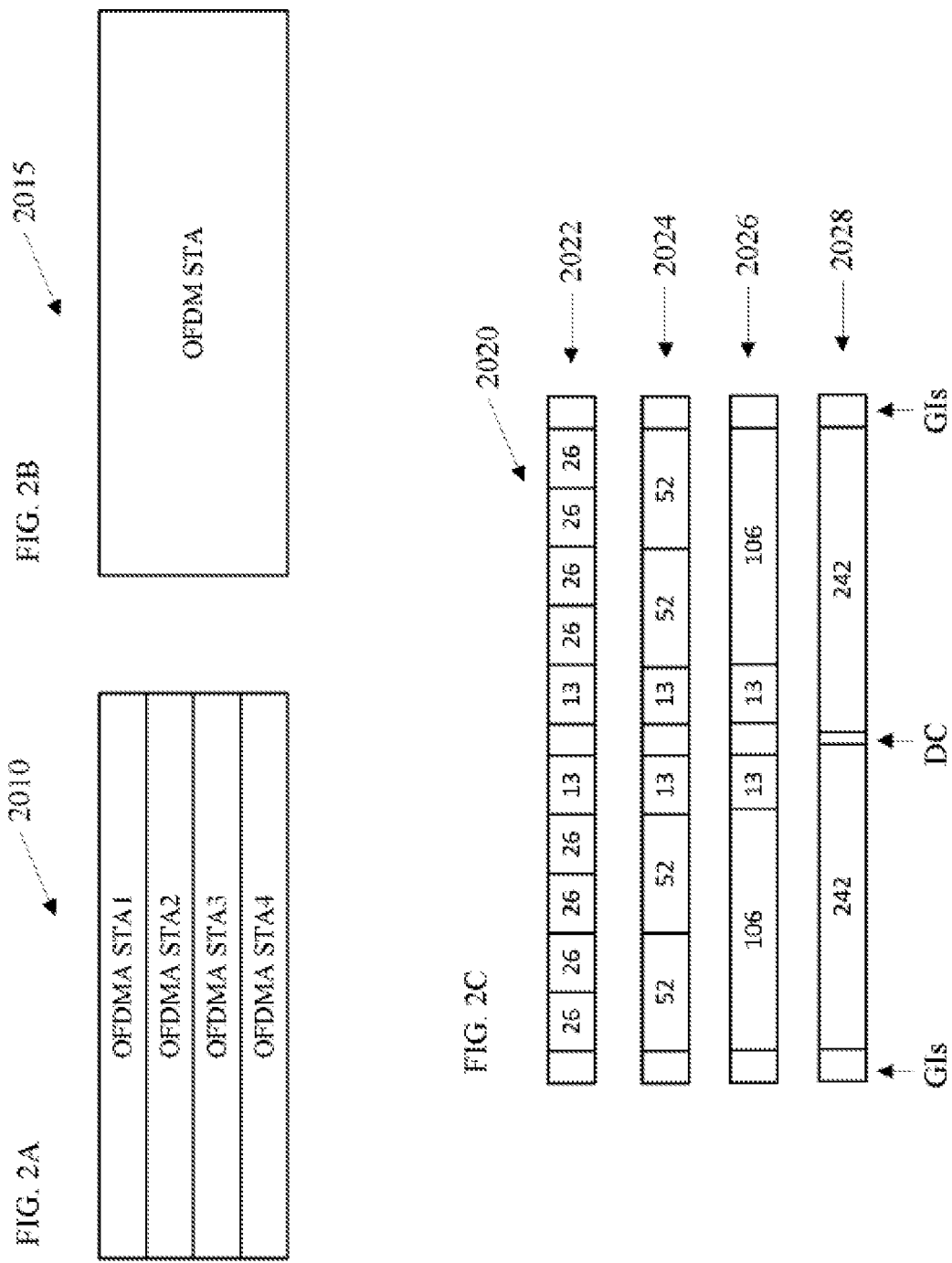

LOW-POWER WAKE-UP RADIO DISCOVERY PROCEDURE AND FRAME FORMAT

CROSS-REFERENCE TO RELATED APPLICATIONS

This application is a continuation of U.S. Non-Provisional patent application Ser. No. 16/646,110, filed Mar. 10, 2020, which is a national stage application under 35 U.S.C. § 371 of PCT International Application Serial No. PCT/US2018/039996, filed on Jun. 28, 2018, and entitled LOW-POWER WAKE-UP RADIO DISCOVERY PROCEDURE AND FRAME FORMAT, which claims the benefit of and priority from U.S. Provisional Patent Application No. 62/570,351 entitled "Methods and Arrangements for Wake-Up Radio Operations," filed Oct. 10, 2017, the entire disclosures of which are incorporated herein by reference.

FIELD

Embodiments relate to wireless communication in a low power setting. Some demonstrative embodiments relate to a low-power wake-up (LP-WU) radio discovery procedure and frame format.

BACKGROUND

The increase in interest in network and Internet connectivity and Internet of Things (IoT) drives design and production of new wireless products. Low power consumption is a design factor to facilitate greater usage of wireless devices such as mobile devices and wearable devices. Wireless communication interfaces can consume significant amounts of power, so product designs often strike a balance between connectivity and power consumption. Lowering power consumption by wireless communication interfaces may facilitate increased connectivity in terms of distance, speed, and duration of wireless communications.

BRIEF DESCRIPTION OF THE DRAWINGS

FIG. 1B depicts an embodiment of a WUR Discovery frame format;

FIG. 1C depicts an embodiment of a Frame Control field format;

FIG. 1D depicts an embodiment of WUR parameter field(s);

FIG. 1E depicts an embodiment of a table of length values and associated WUR parameter field(s);

FIG. 2A depicts an embodiment of transmissions between four STAs and an AP;

FIG. 2B depicts an embodiment of a transmission between one STA and an AP;

FIG. 2C depicts an embodiment of resource units in a 20 Megahertz (MHz) bandwidth;

Like reference numbers and designations in the various drawings indicate like elements.

DETAILED DESCRIPTION

Figure 1A:
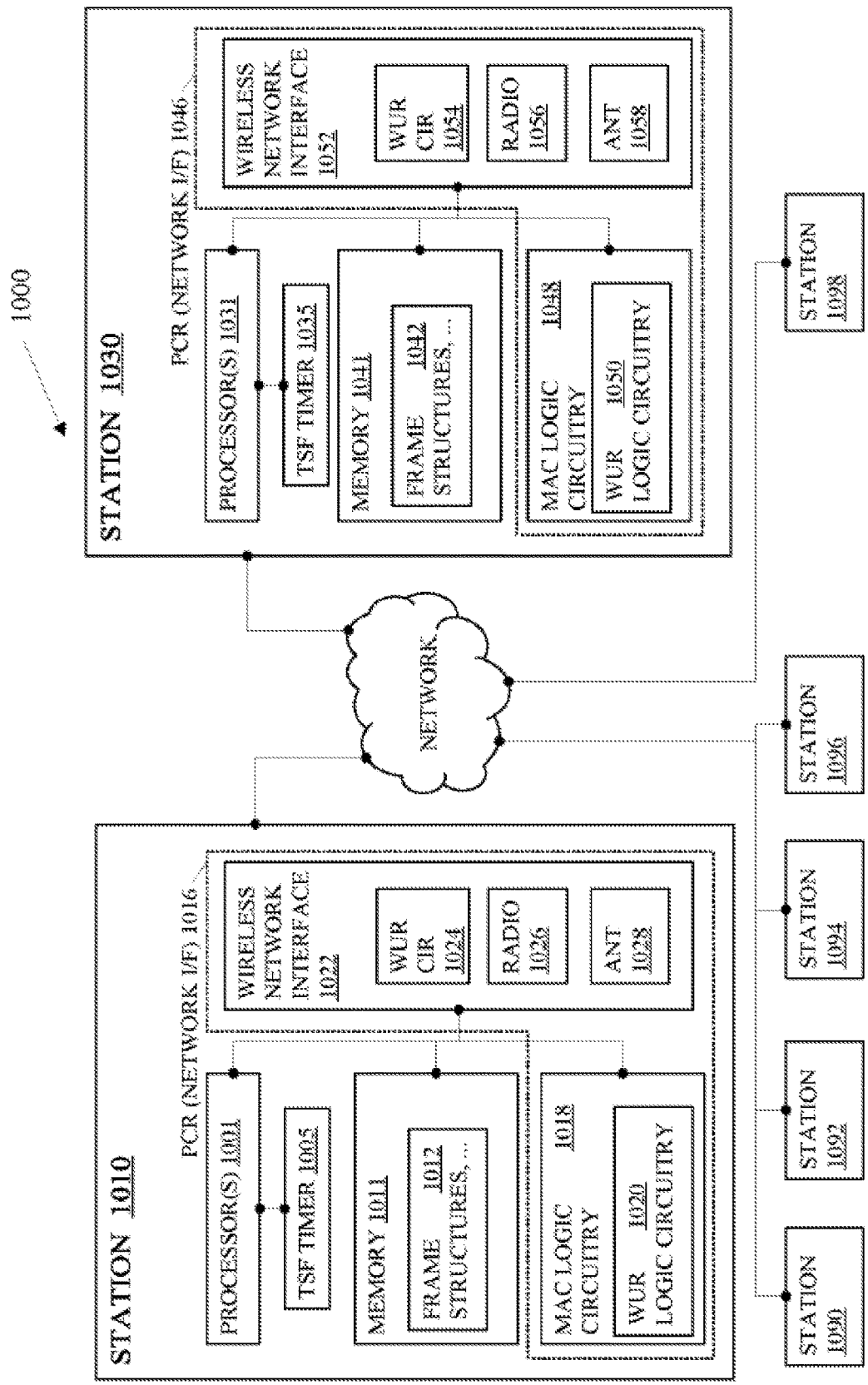
FIG. 1A depicts an embodiment of a wireless network to support wake-up radio (WUR) operations.

FIG. 1A depicts an embodiment of a wireless network 1000 to support wake-up radio operations. In the depicted embodiment, a station 1010 may communicate wirelessly with a station 1030. In some embodiments, the station 1010 is an access point (AP) that comprises a wake-up radio (WUR) transceiver capable of both transmitting WUR packets or frames (herein "packet" and "frame" may be used interchangeably) to other stations (sometimes a station is referred to herein as a "STA") and receiving WUR packets from other stations. In some embodiments, the station 1030 comprises a WUR receiver (WURx) capable of receiving and processing WUR packets, but station 1030 does not necessarily include a WUR transmitter (though in some embodiments station 1030 may also include a WUR transmitter). Stations 1010 and 1030 may also each comprise a primary connectivity radio (PCR) (sometimes referred to as a main radio or 802.11 radio). In various embodiments, the WURx of station 1030 may comprise a Low Power Wake-Up Receiver (LP-WURx) comprising processing circuitry to enable ultra-low power operation for a Wi-Fi (e.g., Institute of Electrical and Electronic Engineers (IEEE) 802.11) device. This LP-WUR may be a companion radio for the PCR. A common subsystem may include a PCR and a LP-WUR. The PCR may be used for data transmission and reception, and may be turned off unless there are packets to be communicated.

A LP-WURx (e.g., of station 1030) may comprise a minimum radio configuration that can receive and detect a WUR wake-up packet from another station (e.g., 1010) such as an AP or a peer station, even when the PCR of the receiving station is powered down. In some situations, the WUR wake-up packet indicates that data is ready for the station. Upon receiving the WUR wake-up packet, the station may switch the PCR on and cause the PCR to receive data from the AP or other station that transmitted the WUR wake-up packet. Thus, the station 1030 may stay in a low power mode (in which the PCR is off) until a wake-up packet is received from a WUR transmitter of the AP or peer station.

In a particular embodiment, a target power consumption of the LP-WUR may be less than about 100 µW in the active state. Some embodiments may leave the WURx powered on continuously. Further embodiments may employ cycling of the WURx to further reduce power consumption. For instance, one embodiment may turn on the WURx every second with, e.g., a 50% duty cycle to reduce power consumption with a slight increase in nominal latency. A standard based on LP-WUR may use a simple, low modulation scheme such as On-Off Keying (OOK), or Frequency Shift Keying (FSK) on a narrow bandwidth, typically less than about 5 MHz, and may meet the transmission range of the main radio.

A Wi-Fi user experience is highly dependent on the stability of the Wi-Fi wireless link. Accordingly, non-access-point (non-AP) wireless STAs regularly perform scanning (either active or passive) for alternative candidate APs, especially when the received signal-to-noise ratio (SNR) with the serving AP becomes low. This scanning procedure tends to penalize the performance of the Wi-Fi link and user experience. In case of active scanning, this scanning also tends to overload the channel airtime occupation in dense environments with probe requests and responses. The discovery of candidate APs is a function that consumes power for the STA, that occupies the airtime, and that disables data transmission and reception during the scanning phase, impacting quality of service (QoS).

In various embodiments of the present disclosure, the WURx of a station (e.g., station 1030) may also function as a scanning receiver for discovery purposes (regardless of whether the PCR of the station is on or off). Thus, scanning responsibilities may be offloaded from the PCR to the WURx, allowing the PCR to focus on data transmission and reception or other functions. For example, when the STA is not associated with any AP and the PCR is off, the WURx may provide a low power option of scanning the neighborhood to learn the environment or accelerate roaming. When the STA is associated with an AP and the PCR is on, the WURx may receive discovery frames from other APs. This may allow the PCR to forego listening for beacons from such APs, which generally would require the PCR to scan various channels and consume additional power.

Accordingly, various embodiments of the present disclosure may implement protocols and procedures for service discovery with a WURx. Some embodiments utilize a WURx to perform service discovery operations previously performed by a PCR. In some embodiments, the WURx discovers services advertised by APs or peer stations while the PCR is in a low power mode, such as a sleep mode. In various embodiments, the WURx discovers services while the PCR performs other communications or operations. In various embodiments, the WURx scans for transmission of discovery frames on a different channel than a channel scanned or otherwise utilized by the PCR. The WURx may scan a particular channel designated for advertisement of services or the WURx may switch between channels periodically to scan multiple channels for transmissions of WUR Discovery frames. In several embodiments, the use of the WURx saves power and/or otherwise improves system performance by offloading a task to discover an AP or a peer station to the WURx. For instance, the PCR does not have to perform scanning across various channels or interrupt current communications to switch to other channels to scan for discovery advertisements because scanning for APs and peer stations is performed by the WURx.

In various embodiments of the present disclosure, an additional type of a WUR frame (i.e., a WUR Discovery frame) may complement existing WUR frames (e.g., WUR beacon frames or WUR wake-up frames) without jeopardizing the WUR frame design and its low overhead. The WUR Discovery frame may be used to carry information related to discovery functionality between two stations. Various embodiments may also include optimizations to the PCR to facilitate the discovery process.

While some of the specific embodiments described below will reference the embodiments with specific configurations, those of skill in the art will realize that embodiments of the present disclosure may advantageously be implemented with other configurations with similar issues or problems.

Referring still to FIG. 1A, wireless network 1000 supports transmission and reception of WUR frames as well as generation, transmission, reception, decoding, and interpretation of simultaneous transmissions between an AP and multiple STAs associated with the AP. The plurality of communications devices comprises stations 1010 and 1030, and stations 1090, 1092, 1094, 1096, and 1098. STA 1010 may comprise an AP and may be coupled via wired and/or wireless connections to each of the STAs 1030, 1090, 1092, 1094, 1096, and 1098.

Each station 1030, 1090, 1092, 1094, 1096, and 1098 may associate with the STA 1010. After associating with the STA 1010, each station 1030, 1090, 1092, 1094, 1096, and 1098 may receive a channel sounding packet for beamforming. In many embodiments, the channel sounding packet may comprise a physical layer (PHY) null data packet (NDP). For instance, the channel sounding packet may include a very high throughput (VHT) NDP or a high efficiency (HE) NDP. In some embodiments, the medium access control (MAC) logic circuitry 1018 may control the timing of transmission of the channel sounding packet.

The STAs 1010 and 1030 comprise processor(s) 1001 and 1031, and memory 1011, and 1041, respectively. The processor(s) 1001 and 1031 may comprise any data processing device such as a microprocessor, a microcontroller, a state machine, and/or the like, and may execute instructions or code stored in the memory 1011 and 1041. The memory 1011 and 1041 may comprise a storage medium such as Dynamic Random Access Memory (DRAM), read only memory (ROM), buffers, registers, cache, flash memory, hard disk drives, solid-state drives, or the like. The memory 1011 and 1041 may store the frames, frame structures, frame headers, or the like, and may also comprise code to implement WUR functionality.

A timestamp is a value from a timing synchronization function (TSF) timer 1005 in an AP (such as the station 1010) that the AP uses to synchronize the stations associated with a basic service set (BSS) and the station 1030 uses to synchronize its TSF timer 1035 with that of the AP while associated with the AP to synchronize communications. A TSF timer, such as TSF timers 1005 and 1035 in FIG. 1A, may reside in a chipset of a station (such as stations 1010 or 1030) in some embodiments, and may reside elsewhere in the station in other embodiments.

The AP may transmit a beacon frame periodically and capture the value in the TSF timer at the time of, concurrently with, or contemporaneously with, transmission to include in a frame body of the beacon frame as the timestamp. A station, such as the station 1030 in FIG. 1A, receives the beacon frame via the PCR (e.g., utilizing wireless network interface 1052) and corrects the TSF timer

1035 for the station 1030. The correction of the TSF timer for the station 1030 synchronizes the station with the BSS by updating the value in the TSF timer 1035.

The MAC logic circuitry 1018 and 1048 may comprise one or more circuits to implement MAC layer functionality and management service interfaces through which MAC layer management functions may be invoked. The MAC logic circuitry 1018 and 1048 may comprise one or more processors to execute MAC layer code stored in the memory 1011 and 1041, respectively. In other embodiments, the MAC logic circuitry 1018 and 1048 may comprise interface circuitry to execute code on the one or more processors 1001 and 1031, respectively.

The MAC logic circuitry 1018 and 1048 may communicate with the PHY logic circuitry of wireless network interfaces 1022 and 1052, respectively, to transmit a PHY frame such as an ACK or may provide a MAC frame such as a WUR Request frame to the PHY logic circuitry to transmit to the STA 1030 and the STA 1010, respectively. The MAC logic circuitry 1018 and 1048 may generate frames such as management, data, and control frames, such as management, data, and control frames defined in, e.g., IEEE Std. 802.11-2016 or other Wi-Fi standard.

The PHY logic circuitry of wireless network interfaces 1022 and 1052 may prepare the MAC frame for transmission by, e.g., determining a preamble to prepend to a MAC frame to create a PHY frame. The preamble may include one or more short training field (STF) values, long training field (LTF) values, and signal (SIG) field values. The wireless network interfaces 1022 and 1052 may be PHY layer devices including a transmitter and a receiver and the transmitter may process the PHY frame to transmit.

After processing the PHY frame, radios 1026 and 1056, each comprising an RF transmitter and an RF receiver, may impress digital data onto subcarriers of RF frequencies for transmission by electromagnetic radiation via elements of an antenna array or antennas 1028 and 1058, respectively. The RF receiver receives electromagnetic energy, extracts the digital data, and decodes the frame.

Figure 2D:
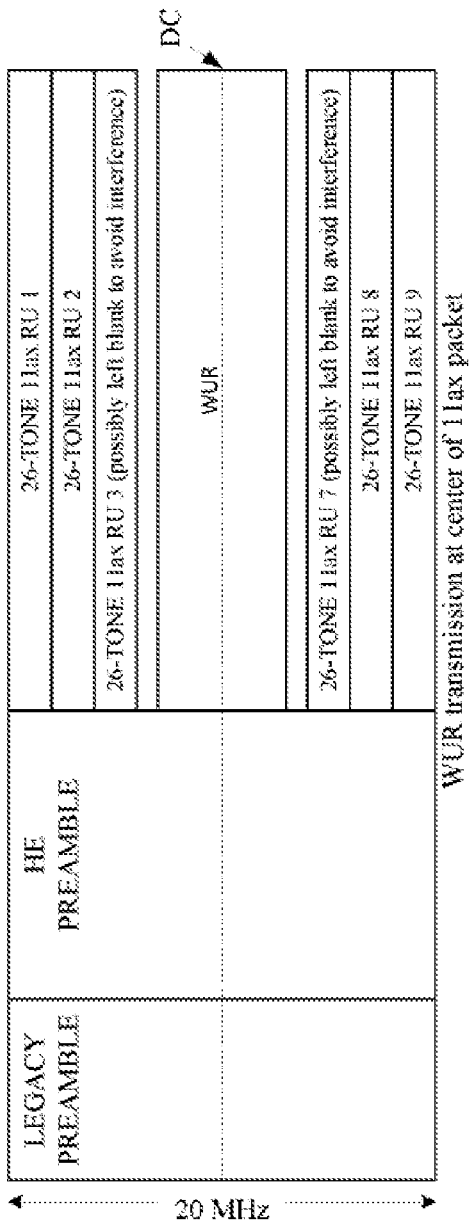
FIG. 2D depicts an embodiment of an Institute of Electrical and Electronic Engineers (IEEE) 802.11ax orthogonal frequency-division multiple access (OFDMA) modulated signal with a wake-up packet at the center resource unit.
Figure 2E:
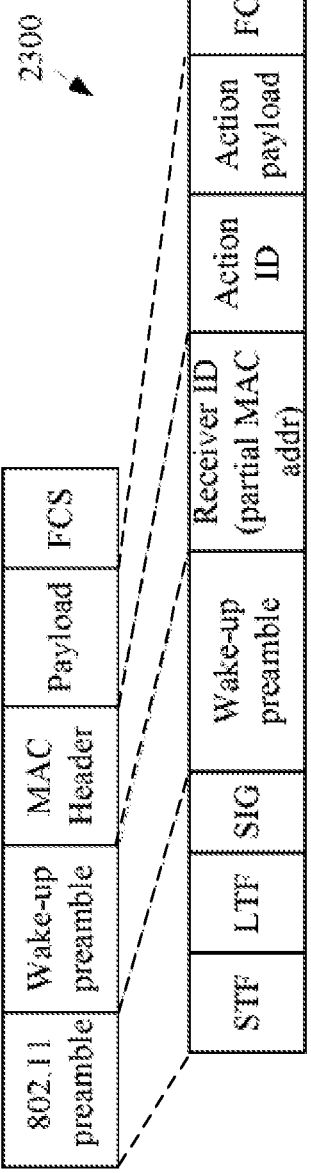
FIG. 2E depicts an embodiment of a wake-up packet prepended by an IEEE 802.11 physical layer preamble.
Figure 2F:
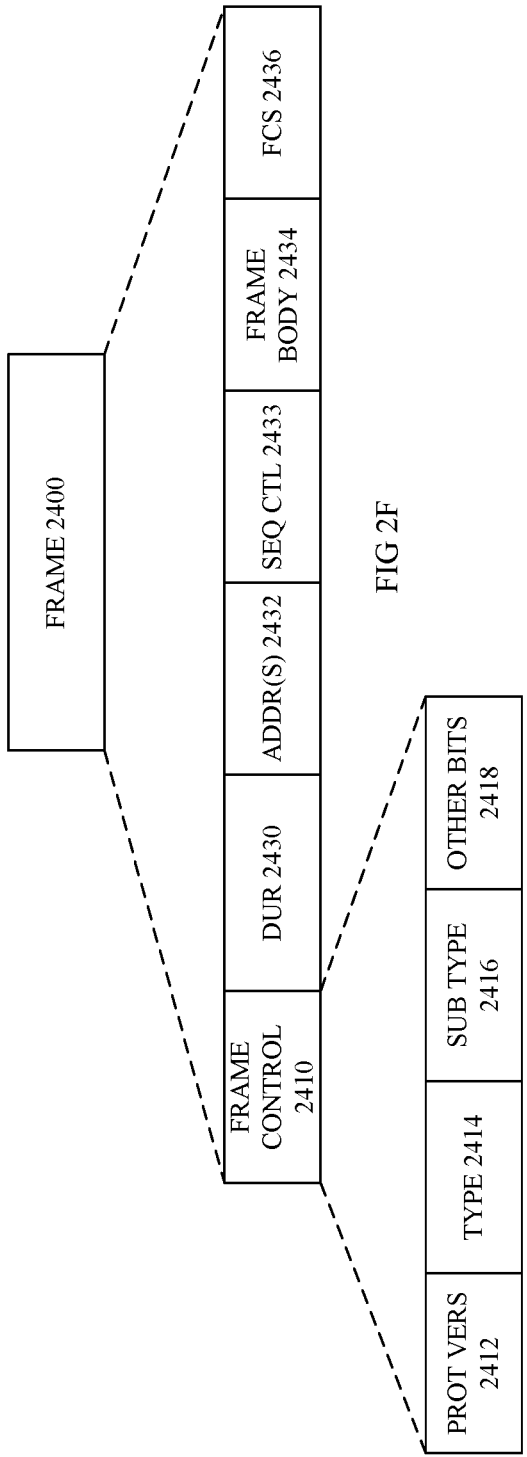
FIG. 2F depicts an embodiment of a data or control frame.

A WURx of station 1030 may couple with a PCR 1046 of station 1030. The PCR is a main radio for communication by a station that can associate with a BSS or a peer station such as a personal basic service set (PBSS) control point (PCP). The PCR can enter a sleep mode to save power and the WURx can awake the PCR in response to receipt of a wake-up packet. For instance, an AP such as the station 1010 in FIG. 1A that manages a BSS may negotiate a service period with the PCR to periodically transmit packets such as voice data packets to the PCR every 10 microseconds. The data packets may include the voice packets in a frame body of the data frame. FIG. 2F illustrates an example of a frame 2400 that can be a data frame, with a frame body 2434 that can include a voice packet.

To save power, embodiments may power down or turn off circuitry associated with the PCR to place the PCR in a low power mode or sleep mode and leave circuitry associated with the WURx (such as the WUR logic circuitry 1050 and WUR circuitry 1054) powered in station 1030. In some embodiments, the WURx is a separate and distinct radio from the PCR. In other embodiments, the WURx is a part of/integrated with the PCR that remains operational while the PCR is in the low power mode. In further embodiments, part of the WURx is in the PCR and part of the WURx is separate and distinct circuitry.

While in the low power mode, the PCR 1046 cannot receive the voice frames (or other data packets) from the station 1010. The station 1010 may transmit a WUR wake-up frame (such as a wake-up frame as illustrated in FIGS. 2D and 2E) to instruct the WURx to wake the PCR 1046 in station 1030. Upon waking, the PCR 1046 may receive and process the voice packet from the station 1010.

Various embodiments may comprise WUR logic circuitry and/or WUR circuitry of an access point and/or a station, a processor and chipset, a network interface (I/F), a wireless network interface, an access point, a station, and/or the like.

FIG. 1B depicts an embodiment of a WUR Discovery frame format. A WUR Discovery frame 1100 may be a frame that advertises the service or service set of an AP or peer station and that the AP or peer station may transmit in a format that a WURx can receive. As an example, station 1010 may transmit WUR Discovery frame 1100 to the WURx of the station 1030. In a particular embodiment, the WUR Discovery frame 1100 is included within a physical layer (PHY) convergence procedure (PLCP) protocol data unit (PPDU). The WUR circuitry 1054 may receive the PPDU, decode the MAC portion of the PPDU (which may include the WUR Discovery frame 1100), and pass the WUR Discovery frame 1100 to the WUR logic circuitry 1050. The WUR logic circuitry 1050 may parse and decode the WUR Discovery frame 1100 to provide the advertised service or service set identifier to the PCR 1046. In some embodiments, the WURx may awaken the PCR upon receipt of the WUR Discovery frame 1100 and the MAC logic circuitry 1048 may parse and interpret the WUR Discovery frame 1100.

The WUR Discovery frame 1100 may include a MAC header 1102, a frame body 1120, and a frame check sequence (FCS) field 1190. The MAC header 1102 may include a Frame Control field 1105, an Address field 1110, and a Type Dependent (TD) control field 1115. Other embodiments of the WUR Discovery frame 1100 may include additional fields or may include less fields. For instance, the frame body 1120 may be an optional field (e.g., some WUR frames may include the frame body 1120 and others may not). In various embodiments, the frame body may have a variable or a fixed length. Other types of WUR frames (e.g., WUR beacon frames and WUR wake-up frames) may include one or more of the fields depicted in FIG. 1B.

FIG. 1C depicts an embodiment of a Frame Control field format. Frame Control field 1200 is an example of the Frame Control field 1105. The Frame Control field 1200 may include one or more of a type field 1210, a length field 1220, and one or more other fields 1230. The type field 1210 may include a value that identifies the type of the WUR frame as a discovery frame. The type field 1210 may specify different values for other types of WUR frames. For example, a first value for the type field may identify the WUR frame as a WUR Discovery frame, a second value for the type field may identify a WUR frame as a WUR beacon frame (a frame that may be sent periodically from a transmitting station to allow a receiving station to determine whether the receiving station is still within range of the transmitting station and to facilitate synchronization between the transmitting station and receiving station, even when the PCR of the receiving station is turned off), and a third value for the type field may identify a WUR frame as a WUR wake-up frame (used to notify the receiving station that a transmitting station has data ready for the receiving station). In a particular embodiment, the Frame Control field is 8 bits long, with 3 or 4 bits for the type field 1210, 3 or 4 bits for the length field 1220, and 1 or 2 bits for the other field(s) 1230. In other embodiments, the Frame Control field and its constituent subfields may be any suitable bit length.

The length field 1220 may include a value that indicates one or more lengths of one or more WUR parameter field(s) 1130 in the frame body 1120. In some embodiments, the length indicator(s) each represent a number of octets of the corresponding WUR parameter field. In various embodiments, the length indicator(s) each indicate inclusion of a specific WUR parameter field or inclusion of specific WUR parameter fields in the frame body 1120. For instance, the value in the length field 1220 may identify one or more specific WUR parameter fields included in the frame body 1120 as illustrated in the length table 1400 in FIG. 1E. The length table 1400 includes a column for length values and a column that associates specific fields with the length values such as the WUR parameter fields 1300 illustrated in FIG. 1D. In the embodiment depicted, a length value of 0 indicates that an Extended Address field is present, a length value of 1 indicates that Extended Address field 1305 and a partial TSF field 1325 are present, a length value of 2 indicates that Extended Address field 1305 and channel information field 1310 are present, a length value of 3 indicates that Extended Address field 1305, channel information field 1310, and partial TSF field 1325 are present, and so on. In some embodiments, the Extended Address field 1305 may be present regardless of the value of the length field 1220. In various embodiments, the channel information field 1310 may only be present for some values of the length field 1220. In some embodiments, the partial TSF field 1325 may only be present for some values of the length field 1220.

Referring again to FIG. 1B, the Address field 1110 may comprise a value that is at least a partial ID of the ID 1140. The ID 1140 may be a ID for the station 1010 such as a basic service set identifier (BSSID) for the station 1010, a transmitted BSSID for the station 1010 (e.g., a physical AP may host multiple virtual APs but only one of these virtual APs transmits beacon frames, thus the transmitted BSSID is the BSSID of this virtual AP; in other words the transmitted BSSID may be a BSSID of a multiple BSSID set to which the AP belongs), a random number chosen by the station 1010, a hashed value of a service set identifier (SSID) for the station 1010, a hashed value of a service ID for the station 1010 (where the service ID may specify a service provided by the network, example services include printing, network access, relay service, etc.), a hashed value of a BSSID for the station 1010, a hashed value of a transmitted BSSID, a combination thereof, or the like. In some embodiments, the ID 1140 may comprise one or more bits to indicate the format of the ID. For example, the bits to indicate the format of the ID may indicate the type of the ID included and/or whether the ID is hashed or is a partial ID. In a particular embodiment, the Address field 1110 is 12 bits long.

In other embodiments, the format for the WUR Discovery frame 1100 may redefine the fields that include partial IDs of the ID field 1140 as a single field designated as the ID field 1140. For instance, the Address field 1110, the TD control field 1115, and/or part of the frame body 1120 such as the Extended Address field 1305 (as depicted in FIG. 1D) of the WUR parameter field(s) 1300 may be combined to form a single field designated as the ID field 1140. In another embodiment, the Address field 1110 and part of the frame body 1120 (e.g., the Extended Address field 1305) may be designated as a first part and a second part of an ID field 1140 or as a most significant bits (MSBs) field and a least significant bits (LSBs) field of the ID field 1140.

A TD control field in a WUR frame typically carries information specific to the type of the frame (e.g., as specified by type field 1210). The TD control field 1115 may include a control value for the WUR Discovery frame or may comprise a partial ID of the ID field 1140. In a particular embodiment, the TD control field 1115 is 12 bits long.

In a particular embodiment, the Address field 1110 may comprise a hash of a BSSID of station 1010 and TD control field 1115 may comprise another hash of the BSSID of station 1010 (where the two hashes comprise at least a portion of the ID 1140). In one embodiment, the frame body 1120 (e.g., Extended Address field 1305) may include a hash of an SSID of station 1010.

The frame body 1120 may comprise the WUR parameter field(s) 1130 and/or may comprise other fields. The frame check sequence (FCS) field 1190 may include an error correction sequence. In one embodiment, the FCS field 1190 may comprise only the cyclic redundancy code (CRC) and may be, e.g., a nibble or four bits. In a particular embodiment, the FCS field 1190 has the same size as an FCS field of a WUR beacon frame or WUR wake-up frame transmitted by a station (in other embodiments, the FCS field 1190 may be smaller or larger than these FCS fields).

FIG. 1D depicts an embodiment of WUR parameter field(s) 1300. The WUR parameter field(s) 1300 is an embodiment of the WUR parameter field(s) 1130 illustrated in FIG. 1B. The WUR parameter field(s) 1300 may comprise one or more of an Extended Address field 1305, a channel information field 1310, a partial TSF field 1325, and one or more other fields 1330.

The Extended Address field 1305 may comprise a partial ID of the ID field 1140 illustrated in FIG. 1B. The channel information field 1310 may indicate a primary 20 MHz channel of a PCR of an AP or peer station that transmits the WUR Discovery frame, such as the station 1010 in FIG. 1A (in some embodiments, the primary 20 MHz channel of the PCR is a channel that is different from one or more channels used to communicate the WUR Discovery frame). This channel information may allow the WURx to indicate to the PCR of the station comprising the WURx (e.g., station 1030), the 20 MHz channel on which the station 1030 can receive additional information from the station 1010 via, e.g., a beacon frame broadcast by the station 1010 or via a probe request and probe response protocol (described in greater detail below). The channel information field 1310 may comprise, e.g., an operating class field 1315 that is, e.g., one octet and a channel field 1320 that is, e.g., one octet. In a particular embodiment, the format of channel information field 1310 conforms to the operating class and channel field as defined in 9.4.1.22 of IEEE 802.11-2016. The operating class field 1315 and the channel field 1320 include values to indicate an operating class and channel, respectively. The operating class may be interpreted in the context of a country specified in or designated for the WUR Discovery frame. The channel may be interpreted in the context of the indicated operating class. In some embodiments, the WUR Discovery frame 1100 may also include a list of channel information fields including a value to indicate how many channel information fields are included in the WUR parameter field(s) 1130. For instance, the station 1010 may operate on more than one channel such as a 2.4 Gigahertz (GHz) channel and a 5 GHz channel. The station 1010 may include channel information in the discovery frame 1100 for each of the channels in the channel information field 1310.

The partial TSF field 1325 may comprise a part of a value from a TSF timer such as the TSF timer 1005 for the station 1010. In other embodiments, the partial TSF may be the value in the TD control field 1115 (i.e., the TD control field 1115 may include the partial TSF). The partial TSF field 1325 may include the same partial TSF value that may be included in a WUR beacon frame to facilitate timing synchronization function updates via the WUR Discovery frames (e.g., the partial TSF field 1325 may have the same size and format of a partial TSF field of a WUR beacon frame). Such embodiments may advantageously reduce traffic by transmitting a WUR Discovery frame in lieu of transmission of both a WUR beacon frame and a WUR Discovery frame, to allow performance of synchronization and discovery operations with transmission and receipt of one frame (the WUR Discovery frame 1100).

As alluded to earlier, in some embodiments, the frame body 1120 includes the Extended Address field 1305 for all length indications, the channel information field 1310 only for some length indications, and the partial TSF information field 1325 only for some length indications. In several embodiments, unused bits are reserved if the WUR parameter field(s) 1300 have a total length that is smaller than the indicated length in the length field 1220. In other words, when the length field 1220 indicates a length that is greater an actual length of one or more WUR parameter field(s) 1300 in the frame body 1120, the difference between the length in the length field 1220 and the actual length represents a set of reserved bits.

Figure 1F:
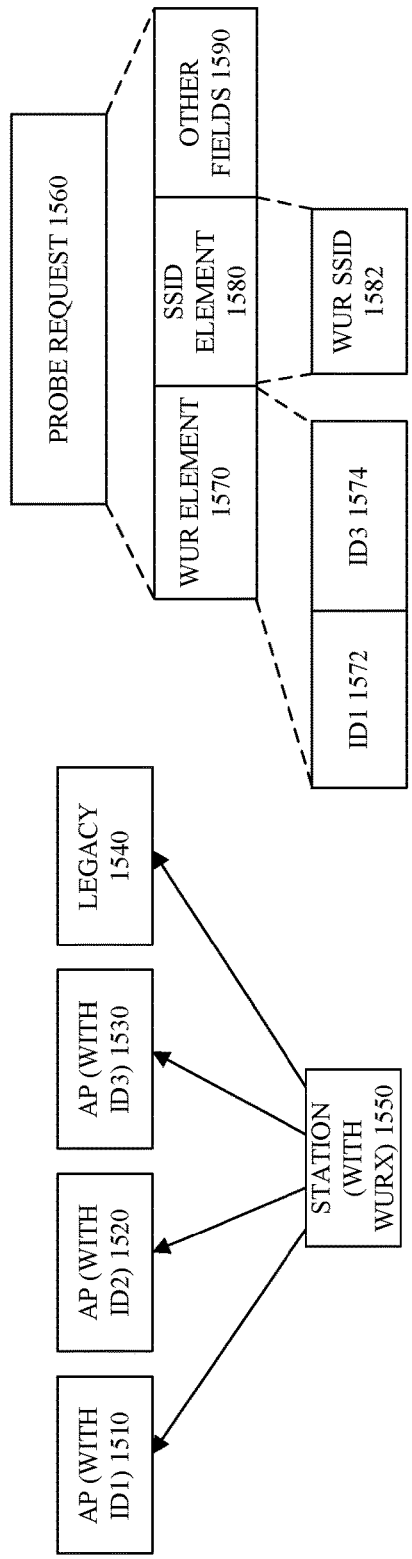
FIGS. 1F-G depict embodiments of primary connectivity radio (PCR) discovery procedures by a station (STA) and an access point (AP)
Figure 1G:
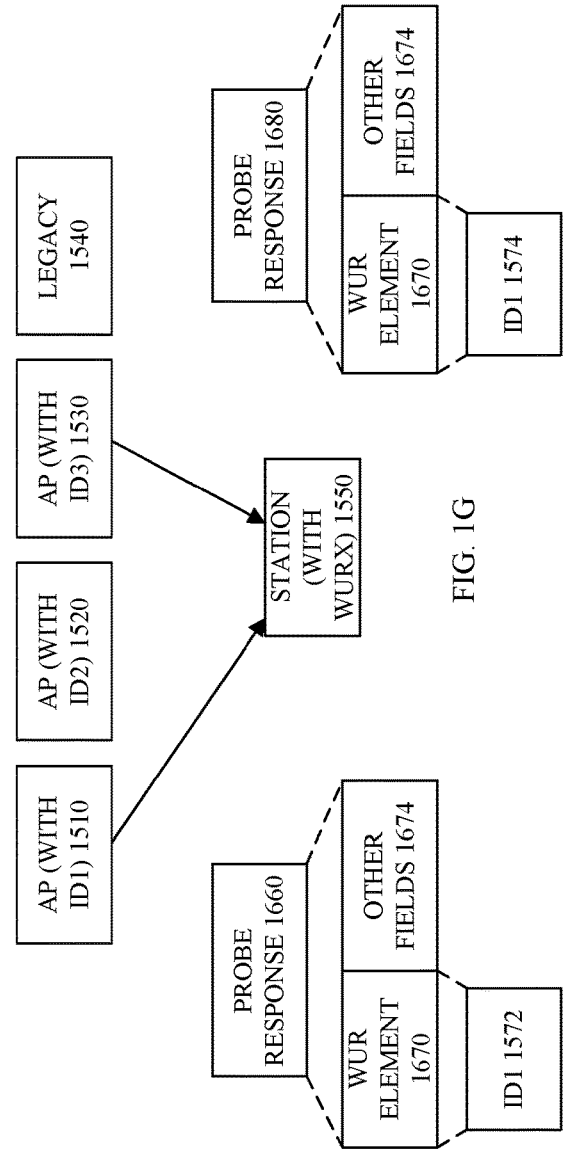

FIGS. 1F and 1G depict embodiments of PCR discovery procedures by a STA and a plurality of APs. After the WURx of the station 1030 receives a WUR Discovery frame 1100 from a station 1010, the PCR of the station 1030 may initiate a process of determining an address, capabilities, and services of the station 1010 by transmission of a probe request, such as the probe request 1560 illustrated in FIG. 1F.

In particular embodiments, station 1030 may address the probe request to a single station 1010 via a unicast probe request. In some embodiments, a BSSID, an SSID, a hash of the same, or other identifying information for an AP may be transmitted in the WUR Discovery frame 1100 (as described above). When such information is transmitted in the WUR Discovery frame 1100, in some embodiments, the station 1030 may transmit a probe request frame to station 1010 in a unicast format with the BSSID, the SSID, a service ID, a transmitted BSSID, a set of random bits to represent a BSSID, bits to indicate a format of the SSID element 1580, a hash of the same, or a combination thereof, in the SSID element 1580 of the unicast probe request. Any of this information in the SSID element 1580 may be used to address the probe request to the station 1010.

In various embodiments, station 1030 may instead broadcast a probe request in response to receiving one or more WUR Discovery frames 1100. For example, if a received WUR Discovery frame 1100 does not include the BSSID, an SSID, or a hash of the same, or the like, or if the station 1030 receives multiple IDs (e.g., via multiple WUR Discovery frames 1100 from multiple APs or peer stations), the station 1030 may broadcast a probe request to multiple stations (e.g., APs or other stations). Broadcasting a probe request frame 1560 may trigger excessive probe response frames unless precautions are taken by the devices of the network to limit the responses. In several embodiments, the station 1030 may limit the probe responses by including a WUR element in the probe request 1560, such as the WUR element 1570 in FIG. 1F. In further embodiments, the station 1030 may additionally or alternatively limit the probe responses by inclusion of a WUR SSID such as the WUR SSID 1582 in in the SSID element 1580 in FIG. 1F. The WUR SSID 1582 may be an SSID that is reserved for WUR Discovery operations or WUR operations more generally (and thus is different from SSIDs that may be used by legacy APs that do not support WUR operations).

The WUR element 1570 in FIG. 1F may include one or more IDs received in a WUR Discovery frame 1100 such as an ID in the ID field 1140 of the discovery frame 1100 (or an ID derived therefrom). The WUR element 1570 shows an ID1 1572 and an ID3 1574 as an example. Based on the ID values of the ID1 1572 and the ID3 1574, the compatible APs (such as station 1010 or other AP), that receive the broadcast probe request 1560 can determine whether to respond to the probe request. For example, if one of the ID values in the WUR element 1570 is associated with the AP because the AP sent the value in a WUR Discovery frame, then the AP may determine to respond to the probe request frame 1560 (e.g., via a probe response). On the other hand, if none of the ID values in the WUR element 1570 are associated with the AP, then the AP may determine not to respond to the probe request frame 1560.

An ID field in WUR element 1570 (e.g., IDs field 1572 or 1574) may comprise any of the IDs described above in association with the ID field 1140 of the WUR Discovery frame 1100. For example, an ID field in WUR element 1570 may comprise a partial SSID, a partial BSSID, a hash of an SSID, a hash of a BSSID, a partial transmitted BSSID, a random set of bits, a service ID, a hash of a service ID, other ID that may identify an AP or peer station, or a combination thereof. In some embodiments, an ID field may also include bits to indicate a format of an ID in the WUR element field. In some embodiments, an ID field in WUR element 1570 may comprise an SSID, a BSSID, a hash of an SSID, a hash of a BSSID, a transmitted BSSID, a random set of bits, a service ID, a hash of a service ID, bits to indicate a format of an ID in the SSID element field, or a combination thereof, to identify an AP or peer station.

Some embodiments (e.g., a unicast probe requests) encompass inclusion of an ID in an SSID element field 1580 to identify a specific AP or peer station in the probe request 1560. Some embodiments (e.g., broadcast probe requests) include the ID in a WUR element field 1570 to identify a specific AP or peer station in the probe request 1560.

The WUR SSID 1582 may be an indicator that associates the probe request frame with WUR Discovery operations or WUR operations (e.g., the WUR SSID 1582 may identify the probe request frame as a WUR Discovery operation). Compatible devices (i.e., devices capable of WUR operations) such as the station 1010 may associate the WUR SSID 1582 with WUR operations and legacy devices (i.e., devices not capable of WUR operations) may associate the WUR SSID 1582 of the probe request 1560 with an address or ID of another device (i.e., a legacy device may determine that the probe request 1560 is addressed to a different device). Thus, the legacy devices may not respond to the probe request frame 1560 as the WUR SSID 1582 does not match any of the SSIDs of the legacy devices (e.g., each legacy device may check its SSID against the WUR SSID 1582 and determine not to respond because the SSID does not match the WUR SSID 1582). This may advantageously reduce or limit the number of probe responses received by the station 1030 in response to transmission of the probe request frame 1560. In some embodiments, the probe request frame 1560 also includes one or more other fields 1590. In a particular embodiment, the probe request frame 1560 is a management frame with one or more fields defined in 9.3.3 of IEEE 802.11-2016.

Thus, a PCR protocol may reserve the WUR SSID 1582 for WUR operations to prevent probe responses from a legacy AP that does not recognize the WUR element 1570. In such embodiments, the station 1030 that sends the probe request 1560 may include in the probe request the SSID element 1580 with the reserved WUR SSID 1582. The station 1010 that sends WUR Discovery frame 1100 may only respond with a probe response 1660 if the SSID element 1580 in the probe request 1560 carries the WUR SSID 1582 (and in some embodiments, the station 1010 will also verify that an ID carried in the WUR element 1570 matches an ID of the station 1010 sent by the station 1010 to the station 1030 in a discovery frame 1100 before responding with a probe response 1660). A legacy AP may not respond with a probe response 1660 since the WUR SSID 1582 in the SSID element 1580 of the probe request 1560 does not match the SSID of the legacy AP.

In a particular embodiment, the WUR element 1570 may include the value in the ID field 1140 of the received WUR Discovery frame 1100. In another embodiment, the WUR element 1570 may include a hashed value of the ID field 1140 of the received WUR Discovery frame 1100. In yet other embodiments, the WUR element 1570 may include a list of IDs, a hashed value of a list of IDs, or hashed values of the list of IDs received from a series of WUR Discovery frames 1100.

The station 1010 that sends WUR Discovery frame 1100 only responds with a probe response frame (such as the probe response frame 1660 which may include relevant information of the BSS in the PCR of the station 1010) if an ID value or a hashed ID value in the WUR element 1570 of the received probe request frame 1560 matches the ID value or hashed ID value used by the station 1010 to send the WUR Discovery frame 1100. This also advantageously reduces the number of probe responses in the neighborhood.

The station 1010 that sends WUR Discovery frame 1100 may also respond to a probe request 1560 with a probe response 1680 that carries a WUR element 1670 in the probe response 1680. The WUR element 1670 may carry the ID value or hashed value of the ID indicated in the ID field 1140 of the WUR Discovery frame 1100 (which may be the same as the ID value or hashed value of the ID sent in WUR element 1570 of the probe request 1560). This helps the station 1030 to determine which station is associated with the ID value or hashed value of the ID.

An example of the discovery procedure is shown in FIGS. 1F and 1G. FIG. 1F illustrates a neighborhood at a moment in time when the station 1550 transmits a broadcast probe request 1560 which is received by APs 1510, 1520, 1530, and 1540. FIG. 1G illustrates the neighborhood at a moment in time when the station 1550 receives responses from some of the APs.

In this example, the STA 1550 receives a WUR Discovery frame 1100 with ID1 1572 and channel information 1310 from AP 1510. The STA 1550 receives a WUR Discovery frame 1100 with ID3 1574 and channel information 1310 from AP 1530. The WUR Discovery frames from ID1 and ID3 may be transmitted in the same frequency channel. In the embodiment depicted, there are four existing APs (1510, 1520, 1530, and 1540) operating in the channel indicated by the channel information 1310 in the WUR Discovery frames 1100. The STA 1550, via its PCR, sends a broadcast probe request 1560 in the channel indicated by the channel information 1310. The probe request 1560 may include WUR element 1570, carrying ID1 1572 and ID3 1574, and an SSID element 1580 carrying the reserved SSID for WUR operation (i.e., WUR SSID 1582).

The legacy AP 1540 does not respond to the probe request 1560 with a probe response because the value in the SSID element 1580 (i.e., the reserved WUR SSID 1582) does not match the SSID of the legacy AP 1540. The AP 1520 does not respond with a probe response because neither of the IDs 1572 and 1574 in the WUR element 1570 match the ID of the AP 1520. The AP 1510 responds with probe response 1660 because ID 1572 in WUR element 1570 of the probe request 1560 matches an ID of the AP transmitted by the AP 1510 in a WUR Discovery frame 1100 and the SSID for WUR operation matches the WUR SSID 1582 received in probe request 1560. The probe response 1660 carries the WUR element 1670 with ID1 1572. The probe response may optionally include one or more other fields 1674. The AP 1530 responds with probe response 1680 because the ID 1574 in the WUR element 1570 matches an ID of the AP transmitted by the AP 1530 in a WUR Discovery frame 1100 and the SSID for WUR operation matches the WUR SSID 1582 received in probe request 1560. The probe response 1680 carries the WUR element 1682 with ID3 1574. The probe response 1680 may optionally include one or more other fields 1684.

The STA 1550 receives the probe responses 1660 and 1680 from AP 1510 and AP 1530 and identifies them as the requested probe responses 1660 and 1680 because the WUR elements 1670 of the probe responses 1660 and 1680 from AP 1510 and AP 1530 carry ID1 1572 and ID3 1574 respectively.

In an alternative embodiment, the station 1030 may include an SSID x in the SSID element 1580 if the hash of the SSID is included in the ID field 1140 of the WUR Discovery frame 1100 and matches the value of SSID x. The station 1030 may include a service ID x in a defined WUR element 1570 if the hash of the service ID is included in the ID field 1140 of the WUR Discovery frame 1100 and matches the value of service ID x. For example, a station 1030 may search for a particular type of network (e.g., an Xfinity® network) or a network with particular services (as identified by a particular SSID or service ID). The station 1030 may calculate or otherwise identify the hash of the SSID or the hash of the service ID and compare that hash against an SSID hash or service ID hash received in a WUR discovery frame from station 1010 and respond to the station 1010 if the hash matches the hash received in the WUR discovery frame.

FIGS. 2A-2C illustrate embodiments of channels and subchannels (or resource units) that can facilitate multiple transmissions simultaneously along with transmission of a WUR packet. FIG. 2A illustrates an embodiment of transmissions 2010 between four stations and an AP on four different subchannels (or resource units) of a channel via OFDMA. Grouping subcarriers into groups of resource units is referred to as subchannelization. Subchannelization defines subchannels that can be allocated to stations depending on their channel conditions and service requirements. An OFDMA system may also allocate different transmit powers to different subchannels. In the depicted embodiment, the OFDMA STA1, OFDMA STA2, OFDMA STA3, and OFDMA STA4 may represent transmissions on four different subchannels of the channel.

As a comparison, FIG. 2B illustrates an embodiment of an OFDM transmission 2015 over the same channel as FIG. 2A. The OFDM transmission 2015 may use the entire channel bandwidth for a transmission to a single STA. In a particular embodiment, a WUR device may be unaware as to whether the packet is a multi-user (e.g., multiplexed with 802.11ax) or a single user transmission.

FIG. 2C illustrates an embodiment of a 20 Megahertz (MHz) bandwidth 2020 on a channel that illustrates different resource unit (RU) configurations 2022, 2024, 2026, and 2028. In OFDMA, for instance, an OFDM symbol is constructed of subcarriers, the number of which is a function of the physical layer convergence procedure (PLCP) protocol data unit (PPDU) (also referred to as the PHY frame) bandwidth. There are several subcarrier types: 1) Data subcarriers which are used for data transmission; 2) Pilot subcarriers which are utilized for phase information and parameter tracking; and 3) unused subcarriers which are not used for data/pilot transmission. The unused subcarriers are, e.g., the DC subcarrier, the Guard band subcarriers at the band edges, and the Null subcarriers.

The RU configuration 2022 illustrates an embodiment of nine RUs that each include 26 subcarriers for data transmission including the two sets of 13 subcarriers on either side of the DC. The RU configuration 2024 illustrates the same bandwidth divided into 5 RUs including four RUs with 52 subcarriers and one RU with 26 subcarriers about the DC for data transmission. The RU configuration 2026 illustrates the same bandwidth divided into 3 RUs including two RUs with 106 subcarriers and one RU with 26 subcarriers about the DC for data transmission. And the RU configuration 2028 illustrates the same bandwidth divided into 2 RUs including two RUs with 242 subcarriers about the DC for data transmission. Embodiments may be capable of additional or alternative bandwidths such as 40 MHz, 80 MHz, 160 MHz and 80+80 MHz.

FIG. 2D depicts an embodiment of an IEEE 802.11ax OFDMA modulated signal with a wake-up packet at the center resource unit. In some embodiments, a WUR frame (such as a wake-up radio beacon, wake-up radio discovery frame, or wake-up packet) may transmit with other packets such as IEEE 802.11ax packets illustrated in FIG. 2D.

Some embodiments may facilitate transmission of the WUR packet in an IEEE 802.11ax multi-user, OFDMA packet format. In some embodiments, the WUR circuitry 1054 may transmit a WUR packet without transmitting packets in other sub-bands of the channel. The basic idea is shown by the example given in FIG. 2D, where the PHY transmits the wake-up packet at the center of the band in a multi-user OFDMA transmission that multiplexes IEEE 802.11ax transmissions in frequency within the same multi-user OFDMA packet. In other words, the PHY transmits multiple different packets on different resource units or frequency sub-bands with the channel simultaneously.

Various embodiments may increase spatial reuse (SR) of Wi-Fi communications with multiple different bandwidths at different frequency bands. Many embodiments focus on bands between 1 Gigahertz (GHz) and 6 GHz. Some embodiments focus on bandwidths such as 20 Megahertz (MHz), 40 MHz, 80 MHz, 160 MHz, and 80+80 MHz, while other embodiments focus on other bandwidths in the same or other frequency bands. However, the embodiments are not limited to the bandwidths and frequency bands described herein.

FIG. 2E depicts an embodiment of a wake-up packet prepended by an IEEE 802.11 physical layer preamble. Some embodiments may transmit a Wake-Up preamble of the WUR packet to synchronize with a WUR of another device. In some embodiments, the Wake-Up preamble may include a rate field or a signal field that includes a transmission rate for a MAC layer packet that follows the Wake-Up preamble. Other embodiments may only be capable of receiving the WUR packet at one rate and, in such embodiments, the WUR packet may not include a rate field or signal field with a transmission rate.

After transmission of the wake-up packet, the WUR circuitry of the PHY of the receiving device may decode the receiver address. Once the WUR circuitry decodes the receiver address, the MAC layer circuitry may determine if the receiver address is addressed to the WUR circuitry. The receiver address may be a MAC address, a WUR address, an association identifier (AID), a broadcast address that identifies a group of receiving devices, or other address. The WUR packet may include a full address, a partial address, or a compressed address (such as a hash of the full or partial address).

The WUR of each communications device may have a unique address. In some embodiments, the address of the WUR differs from the address assigned to the main radio (PCR) of the communications device, such as the MAC address or AID of an IEEE 802.11ax main radio. In other embodiments, the address of the main radio and the address of the WUR is the same address.

FIG. 2E illustrates an embodiment of a WUR packet structure 2300. In the depicted embodiment, the packet structure 2300 illustrates a single STF field, LTF field, and SIG field. These fields constitute an IEEE 802.11 preamble such as an IEEE 802.11ah preamble. For IEEE 802.11ax, the preamble may include a legacy IEEE 802.11 preamble followed by a high efficiency (HE) preamble.

After the 802.11 preamble(s), which may be transmitted across the entire bandwidth of the channel, the WUR packet structure 2300 comprises a wake-up preamble, a MAC header, a payload, and a frame check sequence (FCS) field. The MAC header may include a receiver address. In some embodiments, the MAC header may include additional fields. The payload may include an action identifier (ID) and an action payload. The action ID may identify the structure of the action payload and the action payload may include an instruction to wake a main radio such as an IEEE 802.11ax radio either immediately or after a period of time. In some embodiments, the period of time may identify a target time for the main radio to be ready to receive a packet.

Figure 2G:
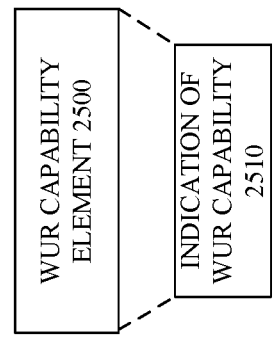
FIG. 2G depicts an embodiment of a WUR capability element.

FIG. 2F depicts an embodiment of a control frame 2400, such as an association or reassociation frame. The frame 2400 is one embodiment of a frame that can transmit the WUR capability element 2500 with an indication of a WUR capability 2510 illustrated in FIG. 2G. The choice of fields for communicating information may be application specific. In other embodiments, for example, the frame 2400 may have more or less fields, different fields, and/or fields with different field lengths.

The frame 2400 may comprise a MAC header with a Frame Control field 2410, a duration field 2430, address(es) field(s) 2432, a sequence control field 2433, a frame body 2434, and a frame check sequence (FCS) field 2436. The Frame Control field 2410 may comprise a protocol version field 2412, a type field 2414, a subtype field 2416, and other frame control bits 2418. The protocol version field 2512 may represent the revision of the corresponding standard that the frame represents. The type field 2414 may identify the type of frame 2414 as, e.g., a control frame. The subtype field 2416 may identify the subtype of the frame as, e.g., a particular type of control frame such as an association frame. The other frame control bits 2418 may represent additional fields that may be present in the Frame Control field such as a more fragments field, a retry field, a power management field, a more data field, or the like.

The duration field 2430 may include a duration of a network allocation vector (NAV) reminder in microseconds. The ADDR(s) field(s) 2432 may include a broadcast address to broadcast to each station associated with the STA 1010 and an address of a specific STA. The ADDR(s) field(s) 2432 may include a full or partial address such as a MAC address of a STA.

Figure 3:
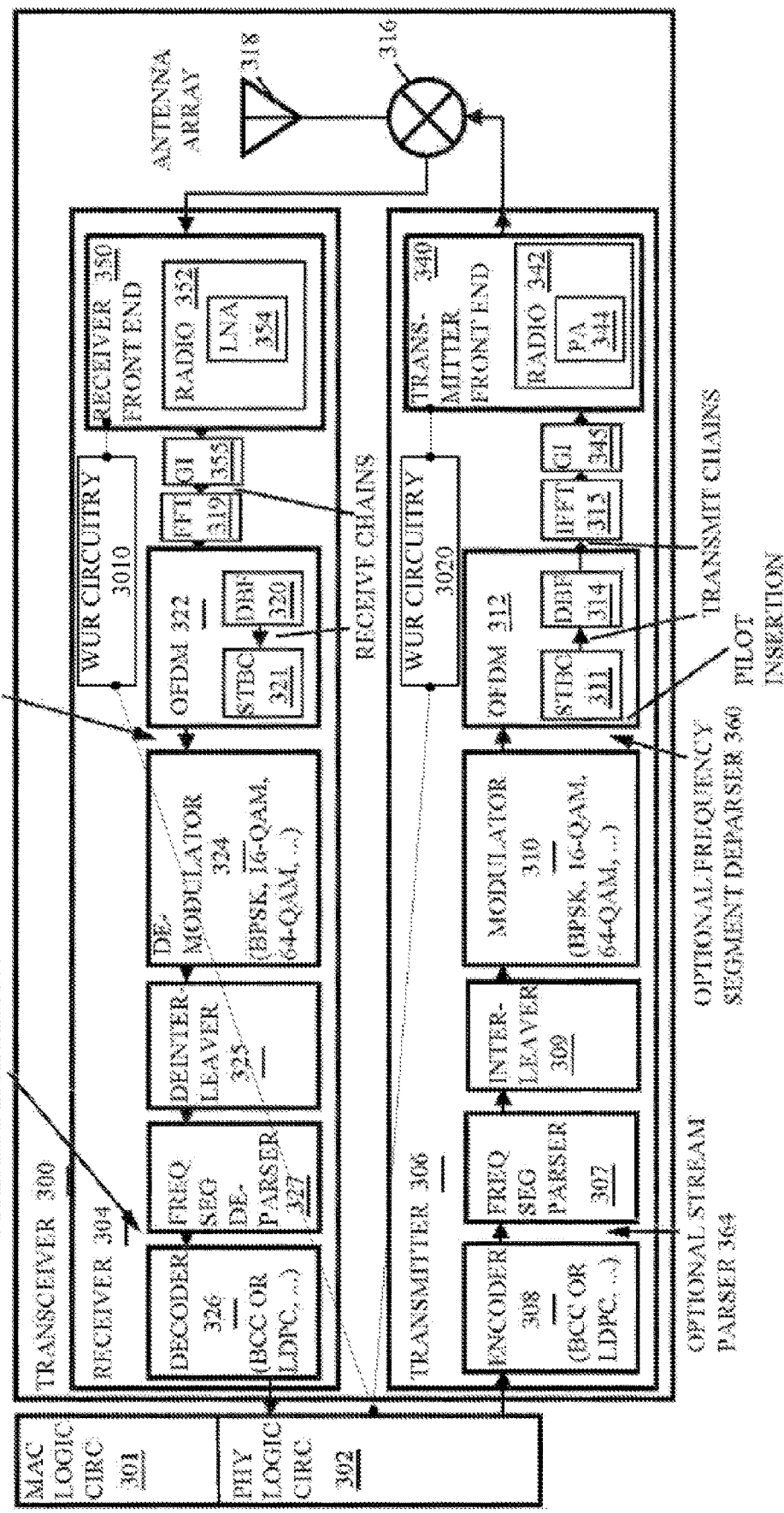
FIG. 3 depicts an embodiment of an apparatus for WUR frame transmissions and receptions.

FIG. 3 depicts an embodiment of an apparatus to generate, transmit, receive, and interpret or decode PHY frames and MAC frames with a WUR packet. Any suitable components depicted in FIG. 3 may be included within any of the STAs described herein. The apparatus comprises a transceiver 300 coupled with MAC logic circuitry 301 and PHY logic circuitry 302. The MAC logic circuitry 301 may determine a frame such as a WUR Response frame and the PHY logic circuitry 302 may determine the PPDU by prepending the frame or multiple frames, also called MAC protocol data units (MPDUs), with a preamble to transmit.

The transceiver 300 comprises a receiver 304 and a transmitter 306. Embodiments have many different combinations of modules to process data because the configurations are deployment specific. FIG. 3 illustrates some of the modules that are common to particular embodiments.

The transmitter 306 may comprise one or more of an encoder 308, a stream parser 364, a frequency segment parser 307, an interleaver 309, a modulator 310, a frequency segment deparser 360, an OFDM module 312, an IFFT module 315, a GI 345, and a transmitter front end 340. The encoder 308 of transmitter 306 receives and encodes a data stream destined for transmission from the MAC logic circuitry 301 with, e.g., a binary convolutional coding (BCC), a low-density parity check coding (LDPC), and/or the like. After coding, scrambling, puncturing and post-FEC padding, a stream parser 364 may optionally divide the data bit streams at the output of the FEC encoder into groups of bits. The frequency segment parser 307 may receive data stream from encoder 308 or streams from the stream parser 364 and optionally parse each data stream into two or more frequency segments to build a contiguous or non-contiguous bandwidth based upon smaller bandwidth frequency segments. The interleaver 309 may interleave rows and columns of bits to prevent long sequences of adjacent noisy bits from entering a BCC decoder of a receiver.

The modulator 310 may receive the data stream from interleaver 309 and may impress the received data blocks onto a sinusoid of a selected frequency for each stream via, e.g., mapping the data blocks into a corresponding set of discrete amplitudes of the sinusoid, or a set of discrete phases of the sinusoid, or a set of discrete frequency shifts relative to the frequency of the sinusoid. In some embodiments, the output of modulator 310 may optionally be fed into the frequency segment deparser 360 to combine frequency segments in a single, contiguous frequency bandwidth of, e.g., 160 MHz. Other embodiments may continue to process the frequency segments as separate data streams for, e.g. a non-contiguous 80+80 MHz bandwidth transmission.

After the modulator 310, the data stream(s) are fed to an OFDM module 312. The OFDM module 312 may comprise a space-time block coding (STBC) module 311, and a digital beamforming (DBF) module 314. The STBC module 311 may receive constellation points from the modulator 310 corresponding to one or more spatial streams and may spread the spatial streams to a greater number of space-time streams. Further embodiments may omit the STBC.

The OFDM module 312 impresses or maps the modulated data formed as OFDM symbols onto a plurality of orthogonal subcarriers so the OFDM symbols are encoded with the subcarriers or tones. The OFDM symbols may be fed to the DBF module 314. Generally, digital beam forming uses digital signal processing algorithms that operate on the signals received by, and transmitted from, an array of antenna elements. Transmit BF processes the channel state to compute a steering matrix that is applied to the transmitted signal to optimize reception at one or more receivers. This is achieved by combining elements in a phased antenna array in such a way that signals at particular angles experience constructive interference while others experience destructive interference.

The Inverse Fast Fourier Transform (IFFT) module 315 may perform an inverse discrete Fourier transform (IDFT) on the OFDM symbols to map on the subcarriers. The guard interval (GI) module 345 may insert guard intervals by prepending to the symbol a circular extension of itself. The GI module 345 may also comprise windowing to optionally smooth the edges of each symbol to increase spectral decay.

The output of the GI module 345 may enter the transmitter front end 340. The transmitter front end 340 may comprise a radio 342 with a power amplifier (PA) 344 to amplify the signal and prepare the signal for transmission via the antenna array 318. In many embodiments, entrance into a spatial reuse mode by a communications device such as a station or AP may reduce the amplification by the PA 344 to reduce channel interference caused by transmissions.

The transceiver 300 may also comprise duplexers 316 connected to antenna array 318. The antenna array 318 radiates the information bearing signals into a time-varying, spatial distribution of electromagnetic energy that can be received by an antenna of a receiver. In several embodiments, the receiver 304 and the transmitter 306 may each comprise its own antenna(s) or antenna array(s).

The transceiver 300 may comprise a receiver 304 for receiving, demodulating, and decoding information bearing communication signals. The receiver 304 may comprise a receiver front-end to detect the signal, detect the start of the packet, remove the carrier frequency, and amplify the subcarriers via a radio 352 with a low noise amplifier (LNA) 354. The receiver 304 may comprise a GI module 355 and a fast Fourier transform (FFT) module 319. The GI module 355 may remove the guard intervals and the windowing and the FFT module 319 may transform the communication signals from the time domain to the frequency domain.

The receiver 304 may also comprise an OFDM module 322, a frequency segment parser 362, a demodulator 324, a deinterleaver 325, a frequency segment deparser 327, a stream deparser 366, and a decoder 326. An equalizer may output the weighted data signals for the OFDM packet to the OFDM module 322. The OFDM 322 extracts signal information as OFDM symbols from the plurality of subcarriers onto which information-bearing communication signals are modulated.

The OFDM module 322 may comprise a DBF module 320, and an STBC module 321. The received signals are fed from the equalizer to the DBF module 320. The DBF module 320 may comprise algorithms to process the received signals as a directional transmission directed toward to the receiver 304. And the STBC module 321 may transform the data streams from the space-time streams to spatial streams.

The output of the STBC module 321 may enter a frequency segment parser 362 if the communication signal is received as a single, contiguous bandwidth signal to parse the signal into, e.g., two or more frequency segments for demodulation and deinterleaving.

The demodulator 324 demodulates the spatial streams. Demodulation is the process of extracting data from the spatial streams to produce demodulated spatial streams. The deinterleaver 325 may deinterleave the sequence of bits of information. The frequency segment deparser 327 may optionally deparse frequency segments as received if received as separate frequency segment signals, or may deparse the frequency segments determined by the optional frequency segment parser 362. The decoder 326 decodes the data from the demodulator 324 and transmits the decoded information, the MPDU, to the MAC sublayer logic 301.

The MAC logic circuitry 301 may parse the MPDU based upon a format defined in the communications device for a frame to determine the particular type of frame by determining the type value and the subtype value. The MAC logic circuitry 301 may then interpret the remainder of MPDU.

While the description of FIG. 3 focuses on a single spatial stream system for simplicity, many embodiments are capable of multiple spatial stream transmissions and use parallel data processing paths for multiple spatial streams from the PHY logic circuitry 302 through to transmission. Further embodiments may include the use of multiple encoders to afford implementation flexibility.

Figure 4B:
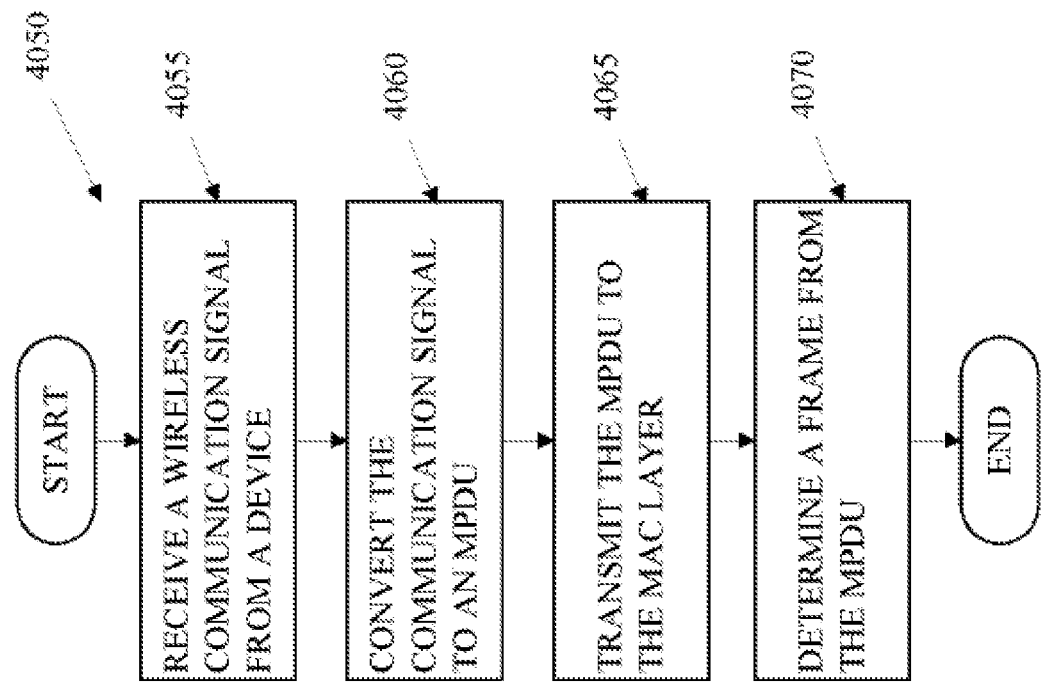
FIG. 4B depicts an embodiment of a flowchart to receive and interpret frames for communications between wireless communication devices.
Figure 4A:
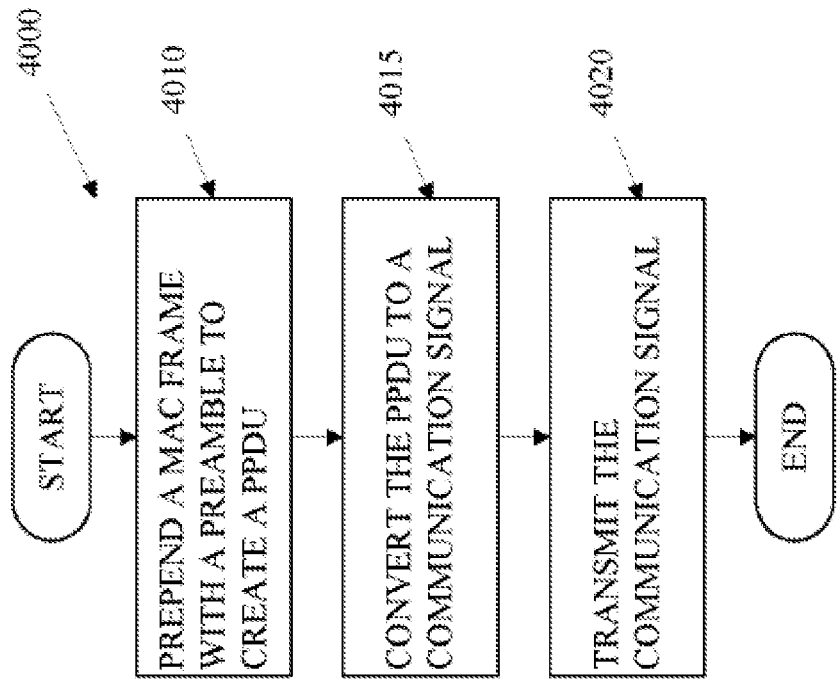
FIG. 4A depicts an embodiment of a flowchart to generate and transmit frames for communications between wireless communication devices.

FIGS. 4A-B depict embodiments of flowcharts 400 and 450 to transmit, receive, and interpret communications with a frame. Referring to FIG. 4A, the flowchart 400 may begin with receiving a beacon frame. The MAC sublayer logic of the communications device may generate the frame as a management frame to transmit to other devices of a synch network and may pass the frame as a MAC protocol data unit (MPDU) to a PHY logic that transforms the data into a packet that can be transmitted to a STA. The PHY logic may generate a preamble to prepend the PHY service data unit (PSDU) (the MPDU from the frame builder) to form a PHY protocol data unit (PPDU) for transmission (element 405). In some embodiments, a PPDU may include more than one MPDU.

The physical layer device such as the transmitter 306 in FIG. 3 or the wireless network interfaces 1022 and 1052 in FIG. 1 may convert the PPDU to a communication signal (element 410). The transmitter may then transmit the communication signal via the antenna (element 415).

FIG. 4B depicts an embodiment of a flowchart to receive and interpret frames for communications between wireless communication devices. Referring to FIG. 4B, the flowchart 450 begins with a receiver of a device such as the receiver 304 in FIG. 3 receiving a communication signal via one or more antenna(s) such as an antenna element of antenna array 318 (element 455). The receiver may convert the communication signal into an MPDU in accordance with the process described in the preamble (element 460). More specifically, the received signal is fed from the one or more antennas to a DBF such as the DBF 220. The DBF transforms the antenna signals into information signals. The output of the DBF is fed to OFDM such as the OFDM 322 in FIG. 3. The OFDM extracts signal information from the plurality of subcarriers onto which information-bearing signals are modulated. Then, the demodulator such as the demodulator 324 demodulates the signal information via, e.g., BPSK, 16-QAM, 64-QAM, 256-QAM, QPSK, or SQPSK. And the decoder such as the decoder 326 decodes the signal information from the demodulator via, e.g., BCC or LDPC, to extract the MPDU (element 460) and transmits the MPDU to MAC sublayer logic such as MAC logic circuitry 301 (element 465).

The MAC logic circuitry may determine frame field values from the MPDU (element 470) such as the management frame fields. For instance, the MAC logic circuitry may determine frame field values such as the type and subtype field values of the synch frame. The MAC sublayer logic may determine that the MPDU comprises a synch frame so the synch logic may terminate an attempt to transmit a synch frame by the device.

Figure 5:
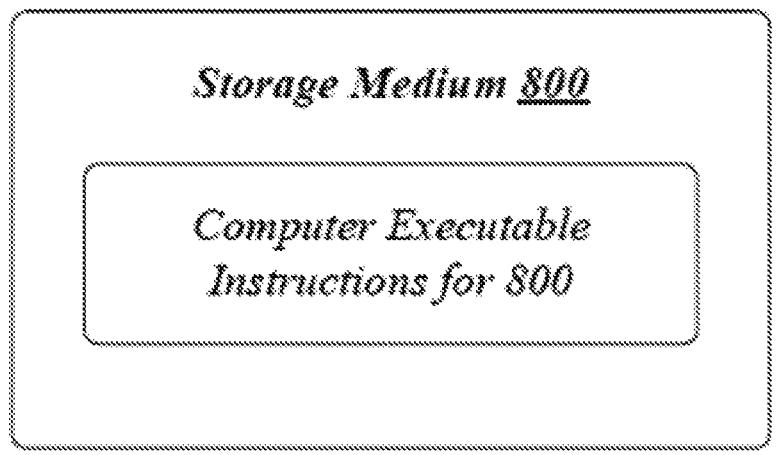
FIG. 5 depicts an embodiment of a computer-readable storage medium to facilitate performance of WUR operations.
Figure 6:
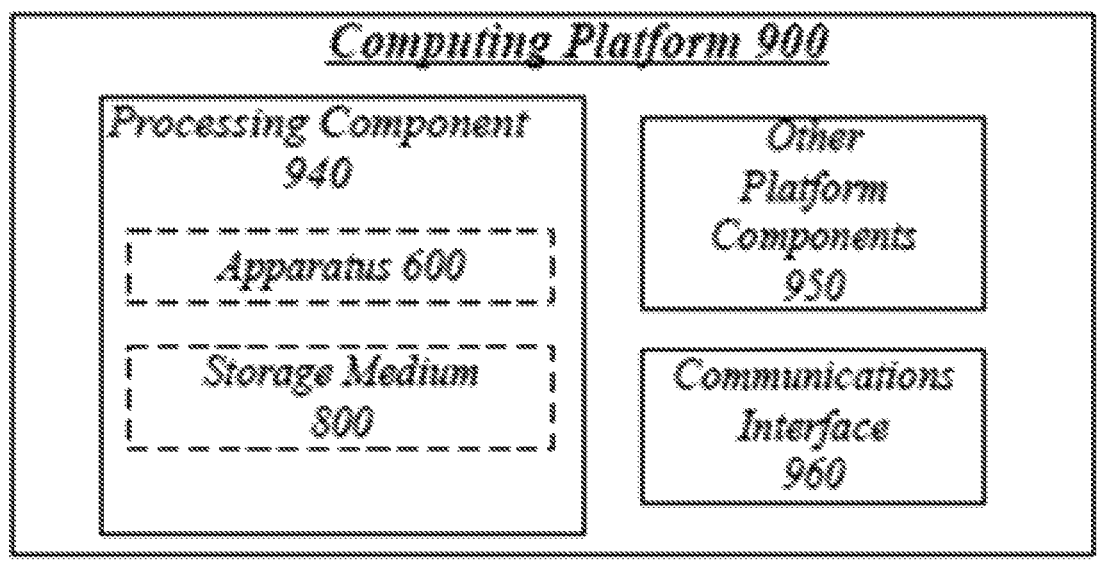
FIG. 6 depicts an embodiment of a computing platform to facilitate performance of WUR operations.

FIGS. 5-6 depict a computer-readable storage medium and a computing platform for WUR operations. Another embodiment is implemented as a program product for implementing systems and methods described with reference to FIGS. 1-4. Components of various embodiments may take the form of hardware, software, or a combination of hardware and software elements. Software may include, but is not limited to firmware, resident software, microcode, etc.

Furthermore, embodiments can take the form of a computer program product (or machine-accessible product) accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device). Examples of a computer-readable medium include a semiconductor or solid-state memory, magnetic tape, a removable computer diskette, a random-access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution.

Logic circuitry, devices, and interfaces herein described may perform functions implemented in hardware and/or implemented with code executed on one or more processors. Circuitry may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. Integrated circuits, chip packages, and chipsets may comprise one or more processors.

Processors may receive signals such as instructions and/or data at the input(s) and process the signals to generate the at least one output. A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

Memory may comprise any storage arrangement including optical media, magnetic media, and circuitry with one or more circuits such as buffers, cache, flash, dynamic random access memory, programmable read only memory, and the like. And code may comprise software, firmware, microcode, or any other form of instructions and/or data designed to accomplish functionality.

The logic as described above may be part of the design for an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a motherboard, or (b) an end product.

FIG. 5 illustrates an example of a storage medium 800 to support compatible low rate for wake-up packet transmission. Storage medium 800 may comprise an article of manufacture. In some examples, storage medium 800 may include any non-transitory computer readable medium or machine readable medium, such as an optical, magnetic or semiconductor storage. Storage medium 800 may store various types of computer executable instructions, such as instructions to implement logic flows and/or techniques described herein. Examples of a computer readable or machine readable storage medium may include any tangible media capable of storing electronic data, including volatile memory or non-volatile memory, removable or non-removable memory, erasable or non-erasable memory, writable or re-writable memory, and so forth. Examples of computer executable instructions may include any suitable type of code, such as source code, compiled code, interpreted code, executable code, static code, dynamic code, object-oriented code, visual code, and the like. The examples are not limited in this context.

FIG. 6 illustrates an example computing platform 900. In some examples, as shown in FIG. 6, computing platform 900 may include a processing component 940, other platform components or a communications interface 960. According to some examples, computing platform 900 may be implemented in a computing device such as a server in a system such as a data center or server farm that supports a manager or controller for managing configurable computing resources as mentioned above. Furthermore, the communications interface 960 may comprise a WUR and may be capable of waking up a main radio of the computing platform 900.

According to some examples, processing component 940 may execute processing operations or logic for apparatus described herein. Processing component 940 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 950 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 960 may include logic and/or features to support a communication interface. For these examples, communications interface 960 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such those described in one or more Ethernet standards promulgated by the IEEE. For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 900 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, functions and/or specific configurations of computing platform 900 described herein, may be included or omitted in various embodiments of computing platform 900, as suitably desired.

The components and features of computing platform 900 may be implemented using any combination of discrete circuitry, ASICs, logic gates and/or single chip architectures. Further, the features of computing platform 900 may be implemented using microcontrollers, programmable logic arrays and/or microprocessors or any combination of the foregoing where suitably appropriate.

It should be appreciated that the exemplary computing platform 900 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

Figure 7:
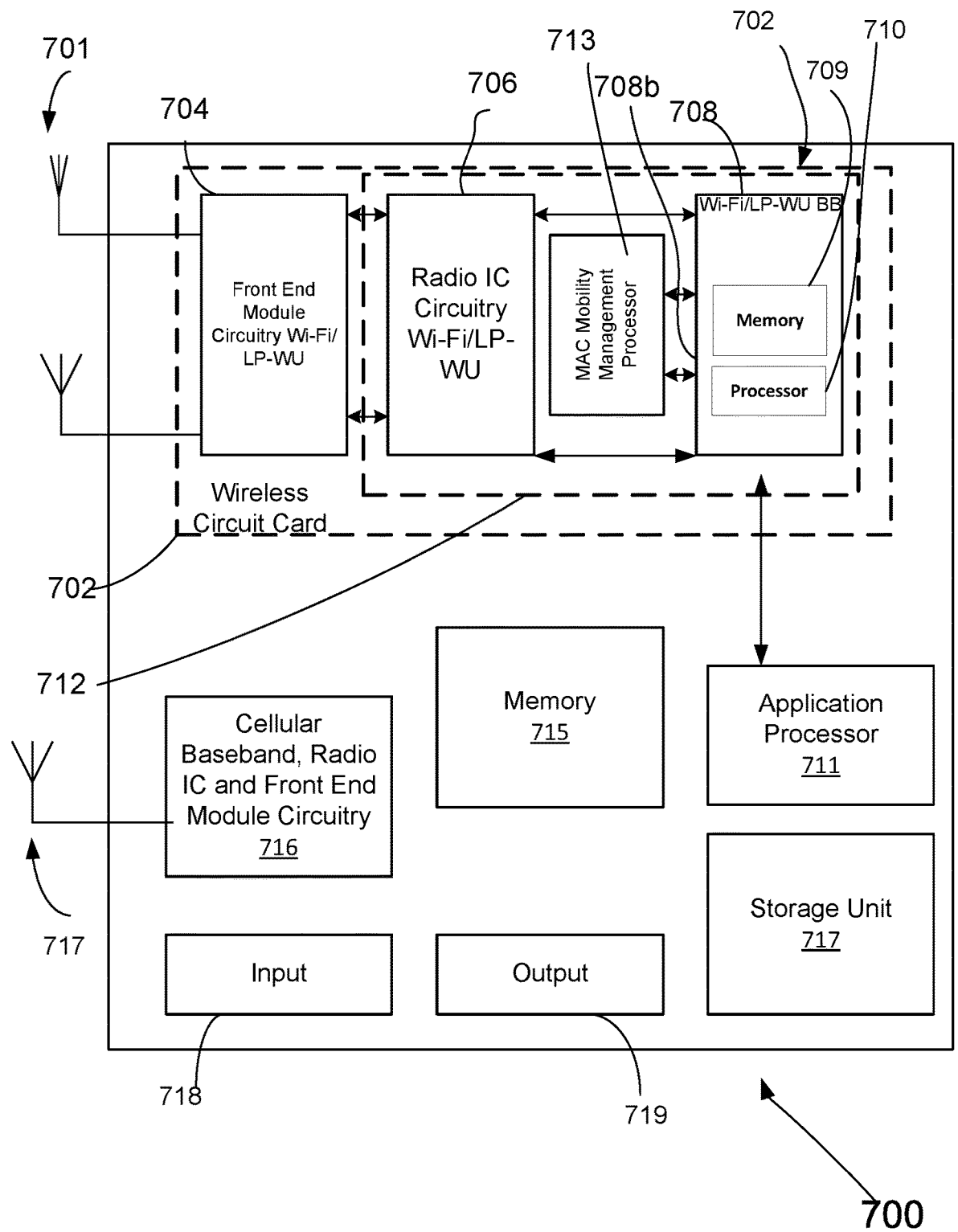
FIG. 7 depicts an embodiment of a radio architecture of a STA to support WUR operations.

FIG. 7 depicts one embodiment of a STA which may be a non-AP STA or an AP. At certain points within the below description, FIG. 2 will be referred to as including an apparatus including an architecture for a STA 700, while at certain other points within the below description, FIG. 2 will be referred to as including an apparatus including an architecture for an AP 700. The context will however be clear based on the description being provided. FIG. 7 depicts a block diagram of a wireless communication device such as STA 700 or AP 700 (hereinafter STA/AP 700) such as any of STA 1010, STA 130, STA 1090, STA 1092, STA 1094, STA 1096, or STA 1098 of FIG. 1, according to some demonstrative embodiments. A wireless communication device may include a wireless communication radio architecture of STA/AP 700 in accordance with some demonstrative embodiments. The radio architecture of STA/AP 700 may include radio front-end module (FEM) circuitry 704, radio IC circuitry 706 and baseband processor 708. The radio architecture of STA/AP 700 as shown includes both Wi-Fi functionality and LP-WUR functionality, although embodiments are not so limited. LP-WUR/LP-WU may refer to Medium Access Control Layer and Physical Layer specifications in accordance with efforts within the IEEE regarding a LP-WUR standard.

In FIG. 7, it is to be noted that the representation of a single antenna may be interpreted to mean one or more antennas. Although FIG. 7 shows a single radio IC circuitry block 706, a single FEM circuitry block 704 and a single baseband circuitry block 708, where each of the above blocks could include both Wi-Fi and LP-WU functionality, these blocks are to be viewed as representing the possibility of one or more circuitry blocks, where potentially one set of distinct circuitry blocks, for example, a distinct FEM circuitry, a distinct radio IC circuitry, and/or a distinct LP-WU baseband circuitry would work to provide the noted LP-WU functionality. In the alternative, such functionality could be integrated either in part or in whole within the Wi-Fi circuitry. In the alternative, components providing LP-WU functionality could be provided, according to some demonstrative embodiments, within circuitry blocks positioned off of the IC 712 or wireless radio card 702, for example adjacent the application processor 711. Also, as used herein, "processing circuitry" or "processor" may include one or more distinctly identifiable processor blocks.

FEM circuitry 704 may include both Wi-Fi functionality (which would allow the processing of Wi-Fi signals) and LP-WU functionality (which would allow the processing of LP-WU signals such as WUR frames). The FEM circuitry 704 may include a receive signal path comprising circuitry configured to operate on Wi-Fi and LP-WU RF signals received from one or more antennas 201, to amplify the received signals and to provide the amplified versions of the received signals to the radio IC circuitry 706 for further processing. FEM circuitry 704 may also include a transmit signal path which may include circuitry configured to amplify signals provided by the radio IC circuitry 706 for wireless transmission by one or more of the antennas 201. The antennas may include directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Radio IC circuitry 706 may include both Wi-Fi and LP-WU functionality, and may include therein a distinct LP-WU radio to process an LP-WU only portion of a signal that includes a LP-WU signal multiplexed into a Wi-Fi signal. Radio IC circuitry 706 as shown may include a receive signal path which may include circuitry to down-convert signals received from the FEM circuitry 704 and provide baseband signals to baseband processor 708. The radio IC circuitry 706 may also include a transmit signal path which may include circuitry to up-convert baseband signals provided by the baseband processor 708 and provide RF output signals to the FEM circuitry 704 for subsequent wireless transmission by the one or more antennas 201. In addition, embodiments include within their scope the provision of a radio IC circuitry that allows transmission of LP-WU signals.

Baseband processing circuitry 708 may include processing circuitry that provides Wi-Fi functionality (hereinafter, main baseband processor), and processing circuitry that provides LP-WU functionality (hereinafter low-power baseband processor). In the instant description, the baseband processing circuitry 708 may include a memory 709, such as, for example, a set of RAM arrays in a Fast Fourier Transform or Inverse Fast Fourier Transform block (not shown) of the baseband processor 708. Processing circuitry 710 may include control logic to process the signals received from the receive signal path of the radio IC circuitry 706. Baseband processing circuitry 708 is also configured to also generate corresponding baseband signals for the transmit signal path of the radio IC circuitry 706, and may further include physical layer (PHY) and medium access control layer (MAC) circuitry, and may further interface with application processor 711 for generation and processing of the baseband signals and for controlling operations of the radio IC circuitry 706. Referring still to FIG. 2, according to the shown embodiment, a MAC mobility management processor 713 may include a processor having logic to provide a number of higher MAC functionalities. For example, processor 713 may instruct the waking up of the main processor, such as the Wi-Fi processor, based on the device receiving and decoding a LP-WU signal. In the alternative, or in conjunction with the MAC mobility management processor 713, some of the higher-level MAC functionalities above may be provided by application processor 711.

In some demonstrative embodiments, the front-end module circuitry 704, the radio IC circuitry 706, and baseband processor 708 may be provided on a single radio card, such as wireless radio card 702. In some other embodiments, the one or more antennas 201, the FEM circuitry 704 and the radio IC circuitry 706 may be provided on a single radio card. In some other embodiments, the radio IC circuitry 706 and the baseband processor 708 may be provided on a single chip or integrated circuit (IC), such as IC 712.

In some demonstrative embodiments, the wireless radio card 702 may include a Wi-Fi radio card and may be configured for Wi-Fi communications, although the scope of the embodiments is not limited in this respect. In some of these embodiments, the radio architecture of STA/AP 700 may be configured to receive and transmit OFDM or OFDMA communication signals over a multicarrier communication channel.

In some other embodiments, the radio architecture of STA/AP 700 may be configured to transmit and receive signals transmitted using one or more modulation techniques other than OFDM or OFDMA, such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, and On-Off Keying (OOK), although the scope of the embodiments is not limited in this respect.

In some demonstrative embodiments, the radio-architecture of STA/AP 700 may include other radio cards, such as a cellular radio card configured for cellular (e.g., 3GPP such as LTE, LTE-Advanced or 5G communications).

In some IEEE 802.11 embodiments, the radio architecture of STA/AP 700 may be configured for communication over various channel bandwidths including bandwidths having center frequencies of 900 MHz, 2.4 GHz, 5 GHz, and bandwidths of less than 5 MHz, or of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths), or any combination of the above frequencies or bandwidths, or any frequencies or bandwidths between the ones expressly noted above. In some demonstrative embodiments, a 320 MHz channel bandwidth may be used. The scope of the embodiments is not limited with respect to the above center frequencies however.

Referring still to FIG. 7, in some demonstrative embodiments, STA/AP 700 may further include an input unit 718, an output unit 719, and a memory unit 715. STA/AP 700 may optionally include other suitable hardware components and/or software components. In some demonstrative embodiments, some or all of the components of STA/AP 700 may be enclosed in a common housing or packaging, and may be interconnected or operably associated using one or more wired or wireless links. In other embodiments, components of STA/AP 700 may be distributed among multiple or separate devices.

In some demonstrative embodiments, application processor 711 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Application processor 711 may execute instructions, for example, of an Operating System (OS) of STA/AP 700 and/or of one or more suitable applications.

In some demonstrative embodiments, input unit 718 may include, for example, one or more input pins on a circuit board, a keyboard, a keypad, a mouse, a touch-screen, a touch-pad, a track-ball, a stylus, a microphone, or other suitable pointing device or input device. Output unit 719 may include, for example, one or more output pins on a circuit board, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory 715 may include, for example, a Random-Access Memory (RAM), a Read-Only Memory (ROM), a Dynamic RAM (DRAM), a Synchronous DRAM (SD-RAM), a flash memory, a volatile memory, a non-volatile memory, a cache memory, a buffer, a short-term memory unit, a long-term memory unit, or other suitable memory units. Storage unit 717 may include, for example, a hard disk drive, a floppy disk drive, a Compact Disk (CD) drive, a CD-ROM drive, a DVD drive, or other suitable removable or non-removable storage units. Memory unit 715 and/or storage unit 717, for example, may store data processed by STA/AP 700.

Referring still to the demonstrative embodiment of FIG. 7, a LP-WUR of a wireless radio card may include, circuitry within FEM 704, within radio IC 706 and within baseband processing circuitry 708 that provide LP-WU functionality. According to some other embodiments, the device shown in FIG. 2 may have more than one FEM or radio IC circuitry or baseband circuitry to provide the Wi-Fi plus LP-WU functionality.

Figure 8:
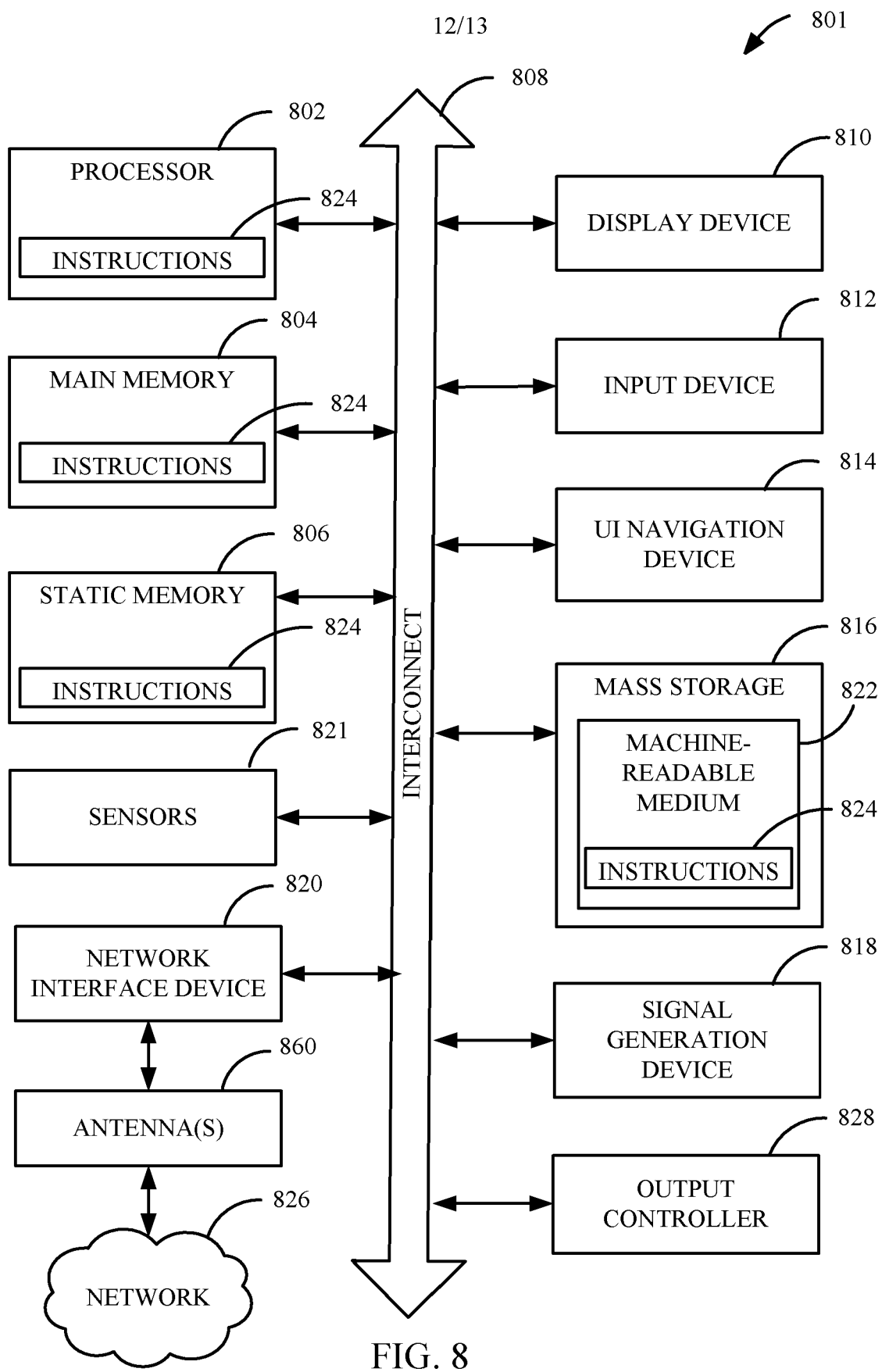
FIG. 8 illustrates a block diagram of an example machine which may perform any one or more of the techniques (e.g., methodologies) of some embodiments.

FIG. 8 illustrates a block diagram of an example machine 801 upon which any one or more of the techniques (e.g., methodologies) discussed herein may performed. In alternative embodiments, the machine 801 may operate as a standalone device or may be connected (e.g., networked) to other machines. In a networked deployment, the machine 801 may operate in the capacity of a server machine, a client machine, or both in server-client network environments. In an example, the machine 801 may act as a peer machine in peer-to-peer (P2P) (or other distributed) network environment. The machine 801 may be an AP 102, HE STA 104, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, such as an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 800 may include a hardware processor 802 (e.g., a central processing unit (CPU), a graphics processing unit (GPU), a hardware processor core, or any combination thereof), a main memory 804, and a static memory 806; some or all of which may communicate with each other via an interlink (e.g., bus) 808. The machine 801 may further include a display device 810, an input device 812 (e.g., a keyboard), and a user interface (UI) navigation device 814 (e.g., a mouse). In an example, the display device 810, input device 812 and UI navigation device 814 may be a touch screen display. The machine 801 may additionally include a mass storage (e.g., drive unit) 816, a signal generation device 818 (e.g., a speaker), a network interface device 820, and one or more sensors 821, such as a global positioning system (GPS) sensor, compass, accelerometer, or other sensor. The machine 801 may include an output controller 828, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.). In some embodiments, the processor 802 and/or instructions 824 may comprise processing circuitry and/or transceiver circuitry.

The storage device 816 may include a machine readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 801. In an example, one or any combination of the hardware processor 802, the main memory 804, the static memory 806, or the storage device 816 may constitute machine readable media.

While the machine readable medium 822 is illustrated as a single medium, the term "machine readable medium" may include a single medium, or multiple media (e.g., a centralized or distributed database, and/or associated caches and servers) configured to store the one or more instructions 824.

An apparatus of the machine 801 may be one or more of a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808.

The term "machine readable medium" may include any medium that is capable of storing, encoding, or carrying instructions for execution by the machine 801 and that cause the machine 801 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine-readable media. In some examples, machine readable media may include machine readable media that is not a transitory propagating signal.

The instructions 824 may further be transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 820 may include one or more physical jacks (e.g., Ethernet, coaxial, or phone jacks) or one or more antennas to connect to the communications network 826. In an example, the network interface device 820 may include one or more antennas 860 to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques. The term "transmission medium" shall be taken to include any intangible medium that is capable of storing, encoding or carrying instructions for execution by the machine 801, and includes digital or analog communications signals or other intangible medium to facilitate communication of such software.

Figure 9:
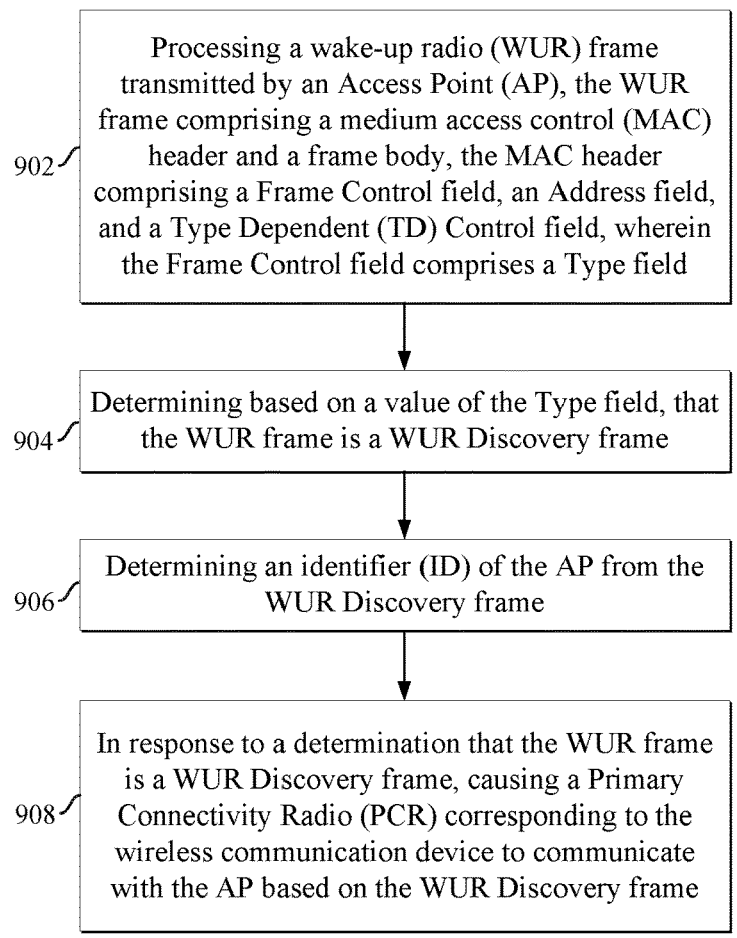
FIG. 9 illustrates a method to be performed at a STA according to some embodiments.

FIG. 9 illustrates a method to be performed at a STA (e.g., STA 1030) according to some embodiments. The method includes at operation 902, processing a wake-up radio (WUR) frame transmitted by an Access Point (AP), the WUR frame comprising a medium access control (MAC) header and a frame body, the MAC header comprising a Frame Control field, an Address field, and a Type Dependent (TD) Control field, wherein the Frame Control field comprises a Type field. The method further includes at operation 904, determining based on a value of the Type field, that the WUR frame is a WUR Discovery frame. The method further includes at operation 906, determining an identifier (ID) of the AP from the WUR Discovery frame. The method also includes at 908, in response to a determination that the WUR frame is a WUR Discovery frame, causing a Primary Connectivity Radio (PCR) corresponding to the wireless communication device to communicate with the AP based on the WUR Discovery frame.

Figure 10:
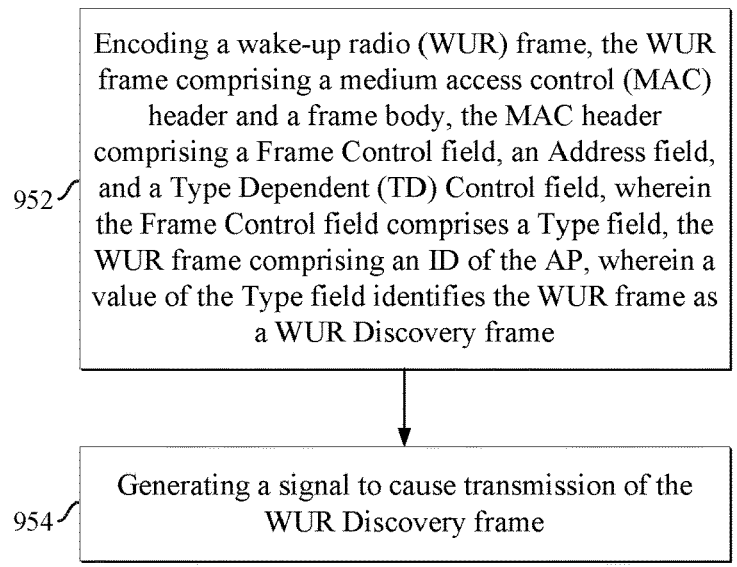
FIG. 10 illustrates a method to be performed at an AP according to some embodiments.

FIG. 10 illustrates a method to be performed at an AP (e.g., STA 1010) according to some embodiments. The method includes at operation 952, encoding a wake-up radio (WUR) frame, the WUR frame comprising a medium access control (MAC) header and a frame body, the MAC header comprising a Frame Control field, an Address field, and a Type Dependent (TD) Control field, wherein the Frame Control field comprises a Type field, the WUR frame comprising an ID of the AP, wherein a value of the Type field identifies the WUR frame as a WUR Discovery frame. The method further includes at 954, generating a signal to cause transmission of the WUR Discovery frame.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Discussions herein utilizing terms such as, for example, "processing," "computing," "calculating," "determining," "establishing," "analyzing," "checking," or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality," as used herein, include, for example, "multiple" or "two or more." For example, "a plurality of items" includes two or more items.

References to "one embodiment," "an embodiment," "demonstrative embodiment," "various embodiments," etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified, the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems—for example, any of the teachings herein may be implemented on a user equipment (UE), a mobile device (MD), a wireless station (STA), a personal computer (PC), a desktop computer, a mobile computer, a laptop computer, a notebook computer, a tablet computer, a server computer, a handheld computer, a handheld device, an Internet of Things (IoT) device, a sensor device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards or protocols, including IEEE 802.11-2012, ("IEEE Standard for Information technology—Telecommunications and information exchange between systems Local and metropolitan area networks—Specific requirements Part 11: Wireless LAN Medium Access Control (MAC) and Physical Layer (PHY) Specifications," Mar. 29, 2012); IEEE802.11ac-2013 ("IEEE P802.11ac-2013, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz," December 2013); IEEE 802.11ad ("IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band," 28 Dec. 2012); IEEE-802.11REVmc ("IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification"); and/or IEEE 802.11az (IEEE 802.11az, Next Generation Positioning), and/or future versions and/or derivatives thereof, devices and/or networks operating in accordance with existing Wi-Fi Alliance (WFA) specifications (including WLAN Neighbor Awareness Networking (NAN) Technical Specification, Version 1.0, May 1, 2015) and/or future versions and/or derivatives thereof, devices and/or networks operating in accordance with existing WFA Peer-to-Peer (P2P) specifications (including WLAN P2P technical specification, version 1.5, Aug. 4, 2014) and/or future versions and/or derivatives thereof, devices and/or networks operating in accordance with existing Wireless-Gigabit-Alliance (WGA) specifications (including Wireless Gigabit Alliance, Inc. WiGig MAC and PHY Specification Version 1.1, April 2011, Final specification) and/or future versions and/or derivatives thereof, devices and/or networks operating in accordance with existing cellular specifications and/or protocols, e.g., 3rd Generation Partnership Project (3GPP), 3GPP Long-Term Evolution (LTE) and/or future versions and/or derivatives thereof, units and/or devices which are part of the above networks, and the like.

Some embodiments may be used to communicate in one-way and/or two-way radio communication systems, cellular radio-telephone communication systems, a mobile phone, a cellular telephone, a wireless telephone, a Personal Communication Systems (PCS) device, a PDA device that incorporates a wireless communication device, a mobile or portable global positioning system (GPS) device, a device that incorporates a GPS receiver or transceiver or chip, a device that incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device—for example, a smartphone—a Wireless Application Protocol (WAP) device, or the like.

Some embodiments may be used to communicate one or more types of wireless communication signals or protocols, for example, radio frequency (RF), infrared (IR), frequency-division multiplexing (FDM), orthogonal FDM (OFDM), orthogonal frequency-division multiple access (OFDMA), FDM time-division multiplexing (TDM), time-division multiple access (TDMA), multi-user MIMO (MU-MIMO), spatial division multiple access (SDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), WLAN, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long-Term Evolution (LTE), LTE advanced, Enhanced Data rates for GSM Evolution (EDGE), or the like. Other embodiments may be used in various other devices, systems, and/or networks.

The term "wireless communication device," as used herein, includes, for example, a portable or non-portable device capable of wireless communication. In some demonstrative embodiments, a wireless communication device may be or may include a peripheral device that is to be integrated with a computer, or a peripheral that is to be attached to a computer. The term "wireless communication device," as used herein, may include, for example, a smallest chip or integrated circuit that may provide a given described functionality.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a receiver to receive the communication signal from at least one other communication unit such as an AP or a STA. The verb "communicating" may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

Some demonstrative embodiments may be used to communicate in a WLAN—for example, a WLAN network. Other embodiments may be used in conjunction with any other suitable wireless communication network—for example, a wireless area network, a "piconet," a WPAN, a WVAN, and the like.

Some demonstrative embodiments may be used to communicate over a frequency band of 2.4 GHz or 5 GHz, and/or a frequency band, such as for Wi-Fi and for low-power wake-up receiver (LP-WUR) communications. However, other embodiments may be implemented utilizing any other suitable wireless communication frequency bands— for example, a sub 1 GHz (S1G) frequency band, an Extremely High Frequency (EHF) band (the millimeter wave (mmWave) frequency band, such as a frequency band within the frequency band of between 20 Ghz and 300 GHZ, such as the 60 Ghz frequency band), WLAN frequency bands, WPAN frequency bands, and the like.

As used herein, the term "circuitry" may refer to, be part of, or include, an Application Specific Integrated Circuit (ASIC), an integrated circuit, an electronic circuit, a processor (shared, dedicated, or group) circuitry, and/or memory circuitry (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware (e.g., silicon blocks of various chips and/or processors). Logic may be included in, and/or implemented as part of, various circuitry (e.g. radio circuitry, receiver circuitry, control circuitry, transmitter circuitry, transceiver circuitry, processor circuitry, or the like). In one example, logic may be embedded in volatile memory and/or non-volatile memory, including random access memory, read-only memory, programmable memory, magnetic memory, flash memory, persistent memory, and the like. Logic may be executed by one or more processors using memory (e.g., registers, buffers, stacks, and the like) coupled to the one or more processors, e.g., as necessary to execute the logic. The term "antenna," as used herein, may include any suitable configuration, structure, and/or arrangement of one or more antenna elements, components, units, assemblies, and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, or the like.

Several embodiments comprise central servers, access points (APs), and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

EXAMPLES

The following examples pertain to further embodiments.

Example 1 includes a wireless communication device including a memory, and a processing circuitry coupled to the memory, the processing circuitry to: process a wake-up radio (WUR) frame transmitted by an Access Point (AP) the WUR frame comprising a medium access control (MAC) header and a frame body, the MAC header comprising a Frame Control field, an Address field, and a Type Dependent (TD) Control field, wherein the Frame Control field comprises a Type field; determine, based on a value of the Type field, that the WUR frame is a WUR Discovery frame; determine an identifier (ID) of the AP from the WUR Discovery frame; and in response to a determination that the WUR frame is a WUR Discovery frame, cause a Primary Connectivity Radio (PCR) corresponding to the wireless communication device to communicate with the AP based on the WUR Discovery frame.

Example 2 includes the subject matter of Example 1, and optionally, wherein the Address field includes at least a portion of the ID.

Example 3 includes the subject matter of Example 1, and optionally, wherein the frame body comprises an Extended Address field, and wherein the Extended Address field includes at least a portion of the ID.

Example 4 includes the subject matter of Example 1, and optionally, wherein the TD Control field includes one of at least a portion of the ID or a partial Timing Synchronization Function (TSF).

Example 5 includes the subject matter of Example 1, and optionally, wherein the ID comprises one or more of: a basic service set identifier (BSSID) of the AP, a hash value of the BSSID of the AP, a transmitted BSSID of a multiple BSSID set to which the AP belongs, a hash value of the transmitted BSSID, a random number, a Service Set Identifier (SSID) corresponding to the AP, a hash value of the SSID, or a hash value of a Service ID.

Example 6 includes the subject matter of Example 1, and optionally, wherein the Address field includes a first portion of the ID and the TD control field includes a second portion of the ID.

Example 7 includes the subject matter of Example 1, and optionally, wherein the ID comprises a hash value of a BSSID of the AP and the Address field includes the hash value of the BSSID.

Example 8 includes the subject matter of Example 1, and optionally, wherein the ID comprises a hash value of a SSID corresponding to the AP, the frame body comprises an Extended Address field, and the Extended Address field includes the hash value of the SSID.

Example 9 includes the subject matter of Example 1, and optionally, wherein the processing circuitry is further to determine an operating class and a primary 20 MHz channel of a Primary Connectivity Radio (PCR) of the AP from a channel information field included in the frame body.

Example 10 includes the subject matter of Example 1, and optionally, wherein communication with the AP based on the WUR Discovery frame comprises transmission of a broadcast probe request frame.

Example 11 includes the subject matter of Example 10, and optionally, wherein the broadcast probe request frame comprises a WUR element and a service set identifier (SSID) element, the WUR element comprising the ID and the SSID element comprising a WUR SSID that is reserved to indicate WUR operations or WUR Discovery operations.

Example 12 includes the subject matter of Example 10, and optionally, wherein the broadcast probe request frame comprises a WUR element including the ID and one or more additional IDs from one or more additional WUR Discovery frames transmitted by one or more additional APs.

Example 13 includes the subject matter of Example 1, and optionally, wherein the processing circuitry is further to process a probe response frame transmitted by the AP, the probe response frame comprising the ID.

Example 14 includes the subject matter of Example 1, and optionally, wherein the processing circuitry is further to initiate an association between the wireless communication device and the AP based on information received in the WUR Discovery frame and based on the communication with the AP based on the WUR Discovery frame.

Example 15 includes the subject matter of Example 1, and optionally, further including a radio integrated circuit coupled to the processing circuitry, and a front-end module coupled to the radio integrated circuit.

Example 16 includes the subject matter of Example 15, and optionally, further including a plurality of antennas coupled to the front-end module.

Example 17 includes the subject matter of Example 1, and optionally, further including the PCR.

Example 18 includes a method to be performed at a wireless communication device that includes a memory and a processing circuitry coupled to the memory, the method including: processing, by the processing circuitry a wake-up radio (WUR) frame transmitted by an Access Point (AP) the WUR frame comprising a medium access control (MAC) header and a frame body, the MAC header comprising a Frame Control field, an Address field, and a Type Dependent (TD) Control field, wherein the Frame Control field comprises a Type field; determining, by the processing circuitry based on a value of the Type field, that the WUR frame is a WUR Discovery frame; determining, by the processing circuitry, an identifier (ID) of the AP from the WUR Discovery frame; and in response to a determination that the WUR frame is a WUR Discovery frame, causing, by the processing circuitry, a Primary Connectivity Radio (PCR) corresponding to the wireless communication device to communicate with the AP based on the WUR Discovery frame.

Example 19 includes the subject matter of Example 18, and optionally, wherein the Address field comprises a first portion of the ID of the AP and the Type Dependent Control field comprises a second portion of the ID.

Example 20 includes the subject matter of Example 18, and optionally, further comprising: receiving the WUR Discovery frame via a wake-up radio on a first frequency channel; and generating a probe request frame in response to the WUR Discovery frame, the probe request frame comprising the ID, wherein the signals comprise the probe request frame.

Example 21 includes the subject matter of Example 20, and optionally, further comprising processing a probe response frame transmitted by the AP in response to the probe request frame, the probe response frame comprising the ID.

Example 22 includes a wireless communication device that includes a memory and a processing circuitry coupled to the memory, the device including: means for processing a wake-up radio (WUR) frame transmitted by an Access Point (AP) the WUR frame comprising a medium access control (MAC) header and a frame body, the MAC header comprising a Frame Control field, an Address field, and a Type Dependent (TD) Control field, wherein the Frame Control field comprises a Type field; means for determining, based on a value of the Type field, that the WUR frame is a WUR Discovery frame; means for determining an identifier (ID) of the AP from the WUR Discovery frame; and means for in response to a determination that the WUR frame is a WUR Discovery frame, causing a Primary Connectivity Radio (PCR) corresponding to the wireless communication device to communicate with the AP based on the WUR Discovery frame.

Example 23 includes the subject matter of Example 22, and optionally, wherein the TD Control field includes one of at least a portion of the ID or a partial Timing Synchronization Function (TSF).

Example 24 includes the subject matter of Example 22, and optionally, wherein the Address field of the MAC header comprises at least a portion of the ID.

Example 25 includes a machine readable storage including machine readable instructions which, when executed, are to implement a method or realize a device as described in any of examples 1-24.

Example 26 includes a wireless communication device of an Access Point (AP), the device including a memory, and a processing circuitry coupled to the memory, the processing circuitry to: encode a wake-up radio (WUR) frame, the WUR frame comprising a medium access control (MAC) header and a frame body, the MAC header comprising a Frame Control field, an Address field, and a Type Dependent (TD) Control field, wherein the Frame Control field comprises a Type field, the WUR frame comprising an ID of the AP, wherein a value of the Type field identifies the WUR frame as a WUR Discovery frame; and generate a signal to cause transmission of the WUR Discovery frame.

Example 27 includes the subject matter of Example 26, and optionally, wherein the Address field includes at least a portion of the ID.

Example 28 includes the subject matter of Example 26, and optionally, wherein the frame body comprises an Extended Address field, and wherein the Extended Address field includes at least a portion of the ID.

Example 29 includes the subject matter of Example 26, and optionally, wherein the TD Control field includes one of at least a portion of the ID or a partial Timing Synchronization Function (TSF).

Example 30 includes the subject matter of Example 26, and optionally, wherein the ID comprises one or more of: a basic service set identifier (BSSID) of the AP, a hash value of the BSSID of the AP, a transmitted BSSID of the AP, a random number, a Service Set Identifier (SSID) corresponding to the AP, a hash value of the SSID, or a hash value of a Service ID.

Example 31 includes the subject matter of Example 26, and optionally, wherein the Address field includes a first portion of the ID and the TD control field includes a second portion of the ID.

Example 32 includes the subject matter of Example 26, and optionally, wherein the ID comprises a hash value of a BSSID of the AP and the Address field includes the hash value of the BSSID.

Example 33 includes the subject matter of Example 26, and optionally, wherein the ID comprises a hash value of a SSID corresponding to the AP, the frame body comprises an Extended Address field, and the Extended Address field includes the hash value of the SSID.

Example 34 includes the subject matter of Example 26, and optionally, wherein the frame body comprises a channel information field specifying an operating class and a primary 20 MHz channel of a Primary Connectivity Radio (PCR) of the AP.

Example 35 includes the subject matter of Example 26, and optionally, wherein the processing circuitry is further to process a broadcast probe request frame transmitted by a station.

Example 36 includes the subject matter of Example 35, and optionally, wherein the broadcast probe request frame comprises a WUR element and a service set identifier (SSID) element, the WUR element comprising the ID and the SSID element comprising a WUR SSID that is reserved to indicate WUR operations or WUR Discovery operations.

Example 37 includes the subject matter of Example 35, and optionally, wherein the broadcast probe request frame comprises a WUR element including the ID and one or more additional IDs from one or more additional WUR Discovery frames transmitted by one or more additional APs.

Example 38 includes the subject matter of Example 26, and optionally, wherein the processing circuitry is further to encode a probe response frame responsive to the broadcast probe request frame, the probe response frame comprising the ID.

Example 39 includes the subject matter of Example 26, and optionally, wherein the processing circuitry is further to associate with a station based at least in part on a response by the station to the WUR Discovery frame.

Example 40 includes the subject matter of Example 26, and optionally, further including a radio integrated circuit coupled to the processing circuitry, and a front-end module coupled to the radio integrated circuit.

Example 41 includes the subject matter of Example 40, and optionally, further including a plurality of antennas coupled to the front-end module.

Example 42 includes the subject matter of Example 26, and optionally, further including a Primary Connectivity Radio (PCR).

Example 43 includes a method to be performed at a wireless communication device that implements an AP, the device including a memory and a processing circuitry coupled to the memory, the method including: encoding, by the processing circuitry, a wake-up radio (WUR) frame, the WUR frame comprising a medium access control (MAC) header and a frame body, the MAC header comprising a Frame Control field, an Address field, and a Type Dependent (TD) Control field, wherein the Frame Control field comprises a Type field, the WUR frame comprising an ID of the Access Point, wherein a value of the Type field identifies the WUR frame as a WUR Discovery frame; and generating, by the processing circuitry, a signal to cause transmission of the WUR Discovery frame.

Example 44 includes the subject matter of Example 43, and optionally, wherein the Address field comprises a first portion of the ID of the AP and the Type Dependent Control field comprises a second portion of the ID.

Example 45 includes the subject matter of Example 43, and optionally, further comprising causing transmission of the WUR Discovery frame to a station; and processing a probe request frame sent by the station in response to the WUR Discovery frame, the probe request frame comprising the ID.

Example 46 includes the subject matter of Example 45, and optionally, further comprising encoding a probe response frame in response to the probe request frame, the probe response frame comprising the ID.

Example 47 includes a wireless communication device that implements an Access Point (AP), the device including a memory and a processing circuitry coupled to the memory, the device including: means for encoding a wake-up radio (WUR) frame, the WUR frame comprising a medium access control (MAC) header and a frame body, the MAC header comprising a Frame Control field, an Address field, and a Type Dependent (TD) Control field, wherein the Frame Control field comprises a Type field, the WUR frame comprising an ID of the AP, wherein a value of the Type field identifies the WUR frame as a WUR Discovery frame; and means for generating a signal to cause transmission of the WUR Discovery frame.

Example 48 includes the subject matter of Example 47, and optionally, wherein the TD Control field includes one of at least a portion of the ID or a partial Timing Synchronization Function (TSF).

Example 49 includes the subject matter of Example 47, and optionally, wherein the Address field of the MAC header comprises at least a portion of the ID.

Example 50 includes a machine readable storage including machine readable instructions which, when executed, are to implement a method or realize a device as described in any of examples 26-49.

Example 51 includes a method to advertise a service, the method comprising: generating, by a MAC logic circuitry of a first device, a wake-up radio (WUR) discovery frame comprising a medium access control (MAC) header and a frame body, the MAC header comprising a Frame Control field with a type field and an Address field, the frame body comprising an Extended Address field, the type field to comprise a value to identify the WUR discovery frame as a discovery frame, wherein the Extended Address field comprises a second partial ID to identify the first device; and encoding for transmission the WUR discovery frame.

Example 52 includes the subject matter of Example 51, and optionally, wherein the wake-up radio (WUR) discovery frame comprises a Type Dependent control field, the Type Dependent control field to comprise a control value, a partial timing synchronization function (TSF) value, or a third partial ID, the third partial ID to identify the first device.

Example 53 includes the subject matter of Example 51, and optionally, wherein the wake-up radio (WUR) discovery frame comprises a Type Dependent control field, the Type Dependent control field to comprise a control value or a third partial ID.

Example 54 includes the subject matter of Example 51, and optionally, wherein the first device comprises an access point or a peer station.

Example 55 includes the subject matter of Example 51, and optionally, wherein the Frame Control field comprises a length field, the length field to comprise a value that indicates a length of one or more WUR parameter fields in the frame body.

Example 56 includes the subject matter of Example 55, and optionally, wherein the Frame Control field comprises a length field, the length field to comprise a value that indicates one or more WUR parameter fields in the frame body.

Example 57 includes the subject matter of Example 55, and optionally, wherein the WUR parameter fields in the frame body comprise the Extended Address field, a channel information field, a partial timing synchronization function (TSF) field, or a combination thereof.

Example 58 includes the subject matter of Example 57, and optionally, wherein the channel information field comprises an operating class field and a channel field to indicate a 20 Megahertz (MHz) channel of a PCR of the first station, wherein the first station is a peer station or an access point.

Example 59 includes the subject matter of Example 57, and optionally, wherein the partial TSF field comprises a partial value from a TSF timer, the partial value captured contemporaneous with transmission of the WUR discovery frame.

Example 60 includes the subject matter of Example 51, and optionally, further comprising causing transmission of a probe response frame in response to receipt of a probe request frame that comprises an ID based on the first partial ID and the second partial ID.

Example 61 includes the subject matter of Example 60, and optionally, wherein the probe request frame further comprises a WUR service set ID (SSID).

Example 62 includes the subject matter of Example 51, and optionally, wherein the first partial ID and the second partial ID comprise: a basic service set identifier (BSSID) for the first device, a transmitted BSSID for the first device, a random number chosen by the first device, a hashed value of a service set identifier (SSID), a hashed value of a service ID, a hashed value of a BSSID, some bits to indicate the format of the ID field, or a combination thereof.

Example 63 includes the subject matter of Example 51, and optionally, wherein the length field indicates a length that is greater an actual length of one or more WUR parameter fields in the frame body and a difference between the length in the length field and the actual length represents a set of reserved bits.

Example 64 includes an apparatus comprising a subset of or all elements as described herein (e.g., in Examples 51-63).

Example 65 includes a system comprising a radio coupled with one or more antennas and a subset of or all elements as described herein (e.g., in Examples 51-63).

Example 66 includes a method comprising a subset of or all operations as described herein (e.g., in Examples 61-63).

Example 67 includes a non-transitory computer-readable medium, comprising instructions, which when executed by circuitry cause the circuitry to implement a logic flow or technique as described herein (e.g., in Examples 61-63).

Example 68 includes an apparatus comprising means arranged to operate as described herein (e.g., in Examples 61-63).

Example 69 includes a method to discover a service, the method comprising: processing, by a physical layer device, a wake-up radio (WUR) discovery frame; parsing, by a MAC logic circuitry of a first device, a WUR discovery frame comprising a medium access control (MAC) header and a frame body, the MAC header comprising a Frame Control field with a type field and an Address field, the frame body comprising an Extended Address field; and determining, by the MAC logic circuitry, a value from the type field to identify the WUR discovery frame as a discovery frame, a first partial identifier (ID) from the Address field to identify the first device, and a second partial ID from the Extended Address field comprises to identify the first device.

Example 70 includes the subject matter of Example 69, and optionally, further comprising generating a probe request frame comprising an identifier, wherein the identifier comprises the first partial ID and the second partial ID.

Example 71 includes the subject matter of Example 69, and optionally, further comprising determining a third partial ID from a Type Dependent control field of the MAC header.

Example 72 includes the subject matter of Example 71, and optionally, further comprising generating a probe request frame comprising an ID, wherein the ID comprises the first partial ID, the second partial ID, and the third partial ID.

Example 73 includes the subject matter of Example 69, and optionally, further comprising generating a probe request frame comprising a WUR element, wherein the WUR element comprises a value based on the partial IDs.

Example 74 includes the subject matter of Example 69, and optionally, further comprising generating a probe request frame comprising a WUR element, wherein the WUR element comprises one or more IDs based on the partial IDs from the WUR discovery frame and one or more additional WUR discovery frames.

Example 75 includes the subject matter of Example 73, and optionally, further comprising generating a probe request frame comprising a service set identifier (SSID) element, wherein the SSID element comprises an SSID, a basic service set identifier (BSSID), a hash of an SSID, a hash of a BSSID, a transmitted BSSID, a random set of bits, a service ID, a hash of a service ID, bits to indicate a format of an ID in the SSID element field, or a combination thereof.

Example 76 includes the subject matter of Example 73, and optionally, further comprising generating a probe request frame comprising a service set identifier (SSID) element, wherein the SSID element comprises a WUR SSID that is reserved to indicate WUR operations or WUR discovery operations.

Example 77 includes the subject matter of Example 73, and optionally, further comprising generating a probe request frame comprising a WUR element, wherein the WUR element comprises one or more IDs, wherein each of the IDs comprises a partial SSID, a partial basic service set identifier (BSSID), a hash of an SSID, a hash of a BSSID, a partial transmitted BSSID, a random set of bits, a service ID, a hash of a service ID, bits to indicate a format of an ID in the WUR element field, or a combination thereof.

Example 78 includes an apparatus comprising a subset of or all elements as described herein (e.g., in Examples 69-77).

Example 79 includes a system comprising a radio coupled with one or more antennas and a subset of or all elements as described herein (e.g., in Examples 69-77).

Example 80 includes a method comprising a subset of or all operations as described herein (e.g., in Examples 69-77).

Example 81 includes a non-transitory computer-readable medium, comprising instructions, which when executed by circuitry cause the circuitry to implement a logic flow or technique as described herein (e.g., in Examples 69-77).

Example 82 includes an apparatus comprising means arranged to operate as described herein (e.g., in Examples 69-77).

Example 83 includes a method to advertise a service, the method comprising: processing, by a physical layer device, a probe request frame; parsing, by a MAC logic circuitry of a first device, a probe request frame comprising a wake-up radio (WUR) element, the WUR element comprising one or more identifier (ID) fields; and determining, by the MAC logic circuitry, one or more values from the one or more ID fields, each value to represent an ID associated with an access point or peer station, wherein the MAC logic circuitry determines that the one or more values represent stations other than the first device; determining, by the MAC logic circuitry, that the probe request is addressed to the stations other than the first device; and not causing transmission of a probe response in response to the probe request based on the determination that the probe request is addressed to the stations other than the first device.

Example 84 includes the subject matter of Example 83, and optionally, wherein the probe request comprises a service set ID (SSID) element, wherein the SSID element comprises an SSID, a basic service set identifier (BSSID), a hash of an SSID, a hash of a BSSID, a transmitted BSSID, a random set of bits, a service ID, a hash of a service ID, bits to indicate a format of an ID in the SSID element field, or a combination thereof.

Example 85 includes the subject matter of Example 83, wherein the probe request comprises a service set ID (SSID) element, wherein the SSID element comprises a WUR SSID that is reserved to indicate WUR operations or WUR discovery operations.

Example 86 includes the subject matter of Example 83, wherein each of the values comprises a partial SSID, a partial basic service set identifier (BSSID), a hash of an SSID, a hash of a BSSID, a partial transmitted BSSID, a random set of bits, a service ID, a hash of a service ID, bits to indicate a format of an ID in the WUR element field, or a combination thereof.

Example 87 includes an apparatus comprising a subset of or all elements as described herein (e.g., in Examples 83-87).

Example 88 includes a system comprising a radio coupled with one or more antennas and a subset of or all elements as described herein (e.g., in Examples 83-87).

Example 89 includes a method comprising a subset of or all operations as described herein (e.g., in Examples 83-87).

Example 90 includes a non-transitory computer-readable medium, comprising instructions, which when executed by circuitry cause the circuitry to implement a logic flow or technique as described herein (e.g., in Examples 83-87).

Example 91 includes an apparatus comprising means arranged to operate as described herein (e.g., in Examples 83-87).

What is claimed is:

1. A wireless communication device of an Access Point (AP), the device including a memory, and a processing circuitry coupled to the memory, the processing circuitry to:
    encode a wake-up radio (WUR) frame, the WUR frame comprising:
        a medium access control (MAC) header, the MAC header comprising a Frame Control field and a Type Dependent (TD) Control field, wherein the Frame Control field comprises a Type field, wherein a value of the Type field identifies the WUR frame as a WUR Discovery frame, and wherein the value of the Type field is selected from a group comprising a second value to identify a WUR frame as a WUR Beacon frame and a third value to identify a WUR frame as a WUR Wake-up frame;
        an ID of the AP; and
        a frame body; and
    generate a signal to cause transmission of the WUR Discovery frame.

2. The device of claim 1, the MAC header comprising an Address field, wherein the Address field includes at least a portion of the ID of the AP.

3. The device of claim 1, wherein the frame body includes at least a portion of the ID of the AP.

4. The device of claim 1, wherein the TD Control field includes at least a portion of the ID of the AP.

5. The device of claim 1, wherein the ID of the AP comprises one or more of: a basic service set identifier (BSSID) of the AP, a hash value of the BSSID of the AP, a transmitted BSSID of a multiple BSSID set to which the AP belongs, a hash value of the transmitted BSSID, a random number, a Service Set Identifier (SSID) corresponding to the AP, a hash value of the SSID, or a hash value of a Service ID.

6. The device of claim 1, the MAC header comprising an Address field, wherein the Address field includes a first portion of the ID of the AP and the TD control field includes a second portion of the ID of the AP.

7. The device of claim 1, the MAC header comprising an Address field, wherein the ID of the AP comprises a hash value of a BSSID of the AP and the Address field includes the hash value of the BSSID.

8. The device of claim 1, wherein the ID of the AP comprises a hash value of a SSID corresponding to the AP, and the frame body includes the hash value of the SSID.

9. The device of claim 1, wherein the frame body comprises a channel information field specifying an operating class and a primary 20 MHz channel of a Primary Connectivity Radio (PCR) of the AP.

10. The device of claim 1, wherein the processing circuitry is further to process a broadcast probe request frame transmitted by a station.

11. The device of claim 10, wherein the broadcast probe request frame comprises a WUR element and a service set identifier (SSID) element, the WUR element comprising the ID of the AP and the SSID element comprising a WUR SSID that is reserved to indicate WUR operations or WUR Discovery operations.

12. The device of claim 10, wherein the broadcast probe request frame comprises a WUR element including the ID of the AP and one or more additional IDs from one or more additional WUR Discovery frames transmitted by one or more additional APs.

13. The device of claim 1, wherein the processing circuitry is further to encode a probe response frame responsive to a broadcast probe request frame, the probe response frame comprising the ID of the AP.

14. The device of claim 1, wherein the processing circuitry is further to associate with a station based at least in part on a response by the station to the WUR Discovery frame.

15. The device of claim 1, further including a radio integrated circuit coupled to the processing circuitry, and a front-end module coupled to the radio integrated circuit.

16. The device of claim 15, further including a plurality of antennas coupled to the front-end module.

17. The device of claim 16, further including a Primary Connectivity Radio (PCR).

18. A method to be performed at a wireless communication device that implements an Access Point (AP), the device including a memory and a processing circuitry coupled to the memory, the method including:
encoding, by the processing circuitry, a wake-up radio (WUR) frame, the WUR frame comprising:
a medium access control (MAC) header, the MAC header comprising a Frame Control field and a Type Dependent (TD) Control field, wherein the Frame Control field comprises a Type field, wherein a value of the Type field identifies the WUR frame as a WUR Discovery frame, and wherein the value of the Type field is selected from a group comprising a second value to identify a WUR frame as a WUR Beacon frame and a third value to identify a WUR frame as a WUR Wake-up frame;
an ID of the AP; and
a frame body, and
generating, by the processing circuitry, a signal to cause transmission of the WUR Discovery frame.

19. The method of claim 18, the MAC header comprising an Address field, wherein the Address field comprises a first portion of the ID of the AP and the Type Dependent Control field comprises a second portion of the ID of the AP.

20. The method of claim 18, further comprising:
causing transmission of the WUR Discovery frame to a station; and
processing a probe request frame sent by the station in response to the WUR Discovery frame, the probe request frame comprising the ID of the AP.

21. The method of claim 20, further comprising encoding a probe response frame in response to the probe request frame, the probe response frame comprising the ID of the AP.

22. A wireless communication device that implements an Access Point (AP), the device including a memory and a processing circuitry coupled to the memory, the device including:
means for encoding a wake-up radio (WUR) frame, the WUR frame comprising:
a medium access control (MAC) header, the MAC header comprising a Frame Control field and a Type Dependent (TD) Control field, wherein the Frame Control field comprises a Type field, wherein a value of the Type field identifies the WUR frame as a WUR Discovery frame, and wherein the value of the Type field is selected from a group comprising a second value to identify a WUR frame as a WUR Beacon frame and a third value to identify a WUR frame as a WUR Wake-up frame;
an ID of the AP; and
a frame body; and
means for generating a signal to cause transmission of the WUR Discovery frame.

23. The device of claim 22, wherein the TD Control field includes one of at least a portion of the ID of the AP or a partial Timing Synchronization Function (TSF).

24. The device of claim 22, the MAC header comprising an Address field, wherein the Address field of the MAC header comprises at least a portion of the ID of the AP.

25. An apparatus comprising processing circuitry and a memory, the processing circuitry to:
process a wake-up radio (WUR) frame transmitted by an Access Point (AP), the WUR frame comprising a medium access control (MAC) header and a frame body, the MAC header comprising a Frame Control field and a Type Dependent (TD) Control field, wherein the Frame Control field comprises a Type field;
determine, based on a value of the Type field, that the WUR frame is a WUR Discovery frame, wherein the value of the Type field is different from a second value for the Type field to identify a WUR Beacon frame and a third value for the Type field to identify a WUR Wake-up frame;
determine an identifier (ID) of the AP from the WUR Discovery frame; and
in response to a determination that the WUR frame is a WUR Discovery frame, cause a Primary Connectivity Radio (PCR) corresponding to a wireless communication device to communicate with the AP based on the WUR Discovery frame.

26. The apparatus of claim 25, the MAC header comprising an Address field, wherein the Address field includes at least a portion of the ID.

27. The apparatus of claim 25, the MAC header comprising an Address field, wherein the Address field includes a first portion of the ID and the TD control field includes a second portion of the ID.

28. The apparatus of claim 25, the MAC header comprising an Address field, wherein the ID comprises a hash value of a basic service set identifier (BSSID) of the AP and the Address field includes the hash value of the BSSID.

29. The apparatus of claim 25, wherein the ID comprises a hash value of a Service Set Identifier (SSID) corresponding to the AP, and the frame body includes the hash value of the SSID.

* * * * *